United States Patent [19]
Nakazawa et al.

[11] Patent Number: 5,306,381
[45] Date of Patent: Apr. 26, 1994

[54] LAMINATING APPARATUS

[75] Inventors: Noriaki Nakazawa; Hideaki Furukawa, both of Yokohama; Norifumi Miyake, Tokyo, all of Japan

[73] Assignees: Canon Kabushiki Kaisha, Tokyo; Canon Aptex Inc., Ibaraki, both of Japan

[21] Appl. No.: 96,839

[22] Filed: Jul. 26, 1993

Related U.S. Application Data

[63] Continuation of Ser. No. 713,311, Jun. 11, 1991, abandoned.

[30] Foreign Application Priority Data

Jun. 11, 1990 [JP] Japan .................................. 2-152144
Jul. 27, 1990 [JP] Japan .................................. 2-200361
Jul. 27, 1990 [JP] Japan .................................. 2-200362
Jun. 11, 1991 [JP] Japan .................................. 3-766284

[51] Int. Cl.$^5$ ........................................... B32B 31/00
[52] U.S. Cl. ................................. 156/359; 156/362; 156/384; 219/508
[58] Field of Search ............... 156/362, 363, 364, 351, 156/352, 359, 361, 366, 384, 555; 53/52; 219/244, 469, 470, 508

[56] References Cited

U.S. PATENT DOCUMENTS

| | | | |
|---|---|---|---|
| 3,816,866 | 6/1974 | Miaskoff et al. ............... | 156/364 X |
| 3,825,725 | 7/1974 | Leitner et al. ................. | 219/469 X |
| 4,214,936 | 7/1980 | Del Bianco ..................... | 156/351 X |
| 4,287,285 | 9/1981 | Mosehauer ...................... | 156/300 X |
| 4,311,549 | 1/1982 | Vercillo ......................... | 156/359 X |
| 4,421,589 | 12/1983 | Armini et al. .................. | 156/359 X |
| 4,653,396 | 3/1987 | Wennerberg ..................... | 219/470 X |
| 4,714,504 | 12/1987 | Cummings et al. ............. | 156/361 X |
| 4,723,068 | 2/1988 | Kusuda et al. .................. | 219/508 X |
| 4,723,129 | 2/1988 | Endo et al. ..................... | 346/1.1 |
| 4,740,796 | 4/1988 | Endo et al. ..................... | 346/1.1 |
| 4,844,758 | 7/1989 | Hamamura et al. ............. | 156/363 X |
| 5,019,203 | 5/1991 | Singer ............................. | 156/555 X |
| 5,049,227 | 9/1991 | Long et al. ...................... | 156/362 |

Primary Examiner—David A. Simmons
Assistant Examiner—J. Sells
Attorney, Agent, or Firm—Fitzpatrick, Cella, Harper & Scinto

[57] ABSTRACT

The present invention provides a laminating apparatus comprising a sheet feeder for feeding a sheet on which an image is formed, a laminate film feeder for feeding laminate films, a heater for heating the laminate films being fed, a device for pressurizing the sheet and the laminate films being fed by the sheet feeder and the laminate film feeder, by overlapping the sheet and the laminate films, a temperature for detecting a temperature of the heater, and a controller means for prohibiting a laminate mode when the temperature detected by the temperature detector is lower than a predetermined set temperature.

55 Claims, 21 Drawing Sheets

LAMINATING APPARATUS

This application is a continuation of application Ser. No. 07/713,311 filed Jun. 11, 1991, now abandoned.

BACKGROUND OF THE INVENTION

1. Field of the Invention

The present invention relates to a laminating apparatus wherein a laminate object (object to be laminated) is encapsuled by heat-reactive upper and lower laminate films to perform a laminate treatment by heating and pressurizing the laminate films while sandwiching the laminate object between the laminate films.

2. Related Background Art

In the past, a laminating apparatus wherein appearance and preservation of a sheet-shaped laminated object (referred to as "sheet" hereinafter) are improved by performing a laminate treatment while encapsuling and sealing the sheet between laminate films has been proposed.

FIG. 24 shows an example of such a conventional laminating apparatus.

In FIG. 24, the laminating apparatus 900 includes an upper laminate film roll 901a of an upper heat-reactive laminate film 902a and a lower laminate film roll 901b of a lower laminate film 902b. The laminate films 902a, 902b unwound from the respective laminate film rolls 901a, 901b are wound around respective pressure and heat rollers 903a, 903b which are urged against each other to be laminated and are tensioned by pull rollers 905a, 905b. The pressure and heat rollers 903a, 903b include heaters 906a, 906b for heating the rollers therein, respectively.

From a sheet supply 909 disposed at an upstream side of the paired pressure and heat rollers 903, a sheet 901 is fed to a nip between the pressure and heat rollers 903a, 903b which constitutes a joining point for the upper and lower laminate films 902a, 902b. The sheet 910 is sandwiched by the upper and lower laminate films 902a, 902b and is pressurized and heated by the paired pressure and heat rollers 903, so that it is adhered between the laminate films. Thereafter, the sheet with the laminate films is ejected out of the apparatus by means of the paired pull rollers 905. Trailing ends of the sheet 910 and of the laminate films 902a, 902b are cut by a cutter unit 911 arranged at a downstream side of the paired pull rollers 905.

Above a body 900 of the apparatus, there is arranged an operation portion 913 which has switches 915, 916 for manually setting the feeding speeds of the laminate films 902a, 902b and of the paired pull rollers 905, and the temperature of outer surfaces of the paired pressure and heat rollers 903.

However, in the case where the above conventional laminating apparatus is connected to an image forming system such as a copying machine, when the copying operation is started, if the temperature of the heaters does not reach a predetermined value, it is feared that the laminate films are not adhered to the sheet, thus producing a poor article. Particularly, since the heaters have a low temperature upon initiation of the laminate treatment, many poor articles will be produced until the heaters reach the predetermined temperature. Thus, much sheet and laminate films are consumed, which is wasteful.

Further, conventionally, for example, the control of the temperature of the heaters 906a, 906b was so effected that, after the electric power was turned ON, the temperature was controlled until the melting temperature of the heat-reactive adhesive was obtained, and, thereafter, the temperature was maintained in a constant value during the waiting for the laminate treatment and the laminating operation. Thus, since the temperature of the heaters is maintained in the constant value during the waiting for the laminate treatment and the laminating operation, the temperature of the whole laminating apparatus is considerably increased, so that the elements constituting the apparatus are also heated up, thus reducing the service life of the elements.

Incidentally, if the heater temperature during the waiting time is held to the same temperature as the heater temperature during the laminating operation, the efficiency of the electric power will be worsened.

Further, in the above-mentioned conventional laminating apparatus, pre-heaters sometimes were provided for pre-heating the laminate films 902a, 902b, as well as the heaters 906a, 906b. In this case, however, since the total consumption power of these heaters and pre-heaters had to be set to have a value lower than an acceptable electric power value, the consumption power of the heaters were required to be smaller than the case of no pre-heaters, with the result that it took a long time until the temperature required for the laminate treatment was obtained. Thus, it was feared that the rate of operation was considerably worsened.

SUMMARY OF THE INVENTION

An object of the present invention is to avoid poor articles due to the low temperature for heating laminate films and to eliminate the waste of a sheet and laminate films.

In order to achieve the above object, the present invention provides a laminating apparatus comprising a temperature detection means for detecting a temperature of a heating means for heating laminate films, and a control means for prohibiting the feeding of a sheet and the laminate films when the temperature detected by the temperature detection means is lower than a predetermined value. Thereby, when the heating temperature is low, the laminate treatment is not effected, thus reducing the poor articles and reducing the cost of the laminate treatment.

Another object of the present invention is to prevent the temperature of the whole apparatus from being increased due to the maintenance of the temperature at a constant value while waiting for the laminate treatment and during the laminating operation, thereby increasing the service life of the apparatus and preventing the performance of the apparatus from being reduced.

In order to achieve this object, the present invention provides a laminating apparatus comprising a sheet detection means for detecting a sheet being fed, and a control means for heating a heating means up to an operation temperature capable of performing the laminate treatment when the detection means detects the sheet and for heating the heating means to a remaining heat temperature lower than the operation temperature when the sheet is not detected by the detection means. Thereby, it is possible to prevent the temperature of the whole apparatus from being increased, to prevent the service life and performance of the apparatus from being deteriorated, and to decrease the loss of the consumed electric power, thus reducing the power consumption.

A further object of the present invention is to prevent the rate of operation of the laminate treatment from being decreased.

In order to achieve this object, the present invention provides a laminating apparatus comprising a control means for controlling the activation and deactivation of each heating means in such a manner that the total consumption electric power of the plural heating means becomes lower than a predetermined electric power. More particularly, the laminating apparatus includes a pre-heating means for pre-heating laminate films, and a primary heating means for providing heat during a pressurizing operation by means of a pressurizing means and wherein the control means controls so that, when one of the pre-heating means and the primary heating means is activated, the other is deactivated, thereby successively heating the laminate films. Thereby, it is possible to heat the laminate films effectively for a short time, thus improving the rate of operation of the laminate treatment and reducing the power consumption.

DETAILED DESCRIPTION OF THE PREFERRED EMBODIMENTS

The present invention will now be explained with reference to the accompanying drawings.

Figure 1:
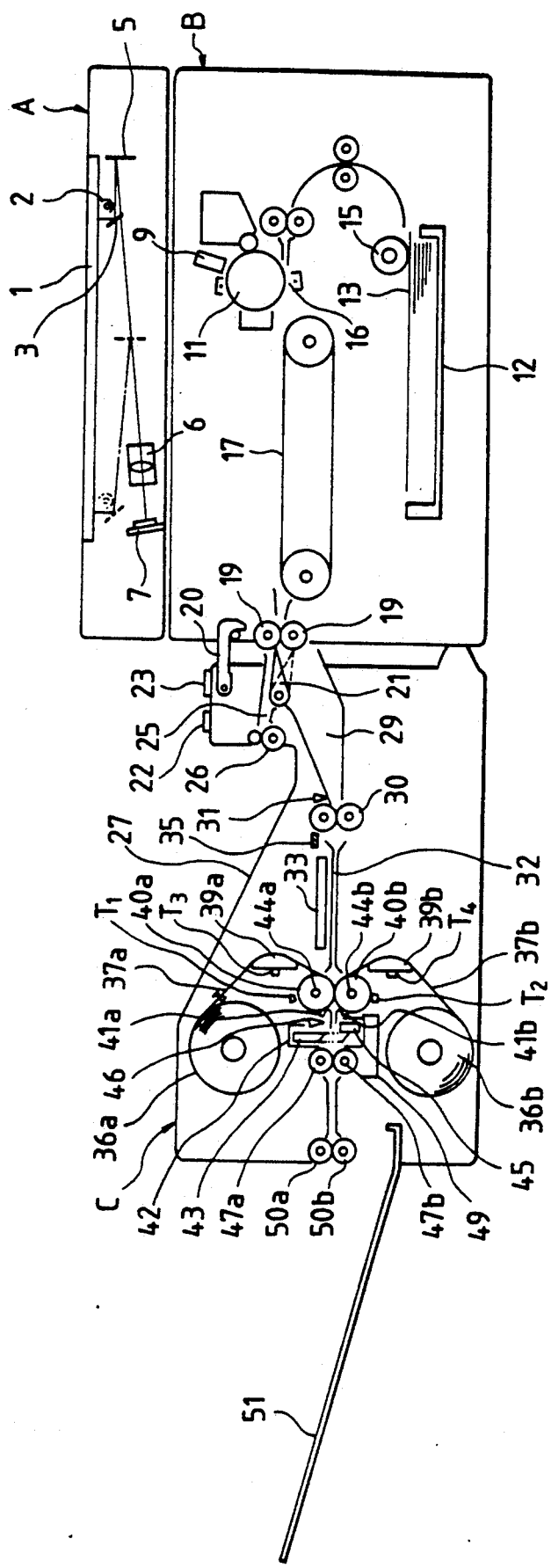
FIG. 1 is an elevational sectional view of a laminating apparatus connected to an image forming system.

FIG. 1 shows, in elevational section, a laminating apparatus according to a preferred embodiment of the present invention, which is connected to a copying machine.

In FIG. 1, a reader A has a platen glass 1 on which an original is rested. The original is illuminated by light from an illumination lamp 2. The light reflected from the original is further reflected by mirrors 3, 5 and is focused on a CCD 7 by means of a focusing lens 6, thus reading the original. The image information read by the reader A is sent to a printer B, where a latent image is formed on a photosensitive drum 11 by means of a scanner 10 on the basis of the image information.

Sheets 13 stacked in a sheet supply cassette 12 arranged in the printer B are fed to the photosensitive drum 11 one by one by means of a sheet supply roller 15. At a transfer station 16, the image formed on the photosensitive drum 11 is transferred onto the sheet 13. Thereafter, the sheet 13 is ejected out of the printer by means of a conveying belt 17 and ejector rollers 19.

In FIG. 1, a laminating apparatus C is removably connected to the printer B by means of a ratch mechanism 20. The laminating apparatus C includes a flapper 21 which is driven by a solenoid (not shown) to select the sheet 13 whether it is laminated or not, in response to a signal from a change-over switch (not shown) disposed in an operation portion 22 arranged on the laminating apparatus C. A display portion 23 is disposed in the proximity of the operation portion 22.

More particularly, when the command for not laminating the sheet 13 is inputted from the operation portion 22, the flapper 21 assumes a position shown by the broken line in FIG. 1, so that the sheet 13 is directed to a non-laminate path 25 and is ejected onto an ejector tray 27 by means of ejector rollers 26. On the other hand, when the command for laminating the sheet 13 is inputted from the operation portion 22, the flapper 13 is moved to a position shown by the solid line in FIG. 1, so that the sheet 13 is directed to a laminate path 29 to send the sheet to a laminate treatment station.

In FIG. 1, a pair of regist rollers 30 are disposed at a downstream side of the laminate path 29 and serve to provide the synchronism of the feeding of the sheet 13 and to correct the skew feed of the sheet. A regist pre-sensor 31 for detecting the presence of the sheet 13 is disposed at an upstream side of the regist rollers 30. At a downstream side of the regist rollers 30, there is arranged a feeding path 32 above which a heater 33 is disposed. When the heater 33 is turned ON, the feeding path 32 is heated to dry the sheet 13 being fed. The ON/OFF control of the heater 33 is effected by the changeover switch of the operation portion 22 in such a manner as to select whether the sheet 13 is heated or not.

A density detection sensor 35 such as an optical sensor is disposed between the paired regist rollers 30 and the heater 33, which sensor serves to detect the density of the image on the sheet 13. The ON/OFF control of the heater 33 may be effected on the basis of the image density information.

Sheet rolls 36a, 36b of laminate films 37a, 37b are arranged at upper and lower portions within the laminating apparatus C. Pre-heaters 39a, 39b are provided for pre-heating the laminate films 37a, 37b. Each of the pre-heaters 39a, 39b has a curved configuration to provide a wider area to heat the laminate film 37a or 37b, and the heating temperature of the pre-heaters are detected by sensors $T_3$, $T_4$ arranged on surfaces of the pre-heaters.

Pressure rollers 40a, 40b serve to pinch the laminate films 37a, 37b heated by the pre-heaters 39a, 39b therebetween to heat and pressurize them, thereby performing the laminate treatment of the sheet 13. The heating of the pressure rollers 40a, 40b is effected by laminate heaters 44a, 44b arranged at shaft portions of these rollers, and the temperatures of the rollers are detected by sensors $T_1$, $T_2$ disposed near the rollers. Separating pawls or claws 41a, 41b have free ends contacting the peripheral surfaces of the pressure rollers 40a, 40b, so that they can separate the laminate films 37a, 37b from the surfaces of the pressure rollers 40a, 40b if the former is adhered to the latter. A cutter unit 42 is constituted by a cutter 43, die 45 and a cutter motor and serves to cut a leading end and a trailing end of the laminate-treated sheet 13.

A laminate sensor 46 such as an optical sensor a reflection type serves to detect the leading and trailing ends of the laminate-treated sheet 13. Peripheral speeds of pull rollers 47a, 47b are set to be greater than those of the pressure rollers 40a, 40b, so that the laminated-treated sheet 13 is subjected to a predetermined tension between the pull rollers 47a, 47b and the pressure rollers 40a, 40b.

The sheet rollers 36a, 36b are subjected to predetermined loads in the sheet unwinding directions, and the laminate films 37a, 37b pulled by the pull rollers 47a, 47b are tensioned between the pull rollers 47a, 47b and the sheet rolls 36a, 36b via the pressure rollers 40a, 40b and the laminate heaters 39a, 39b.

A waste containing case 49 serves to collect the cut pieces of the laminate films 37a, 37b cut by the cutter unit 42 (laminate film pieces not including a portion of the sheet 13). The waste containing case 49 can be pulled out of the laminating apparatus. Laminate ejector rollers 59a, 59b serve to eject the laminated-treated sheet 13 out of the laminating apparatus C onto a laminate tray 51.

Next, constructional elements of the laminating apparatus C will be fully described with reference to FIGS. 2 to 4.

Figure 2:
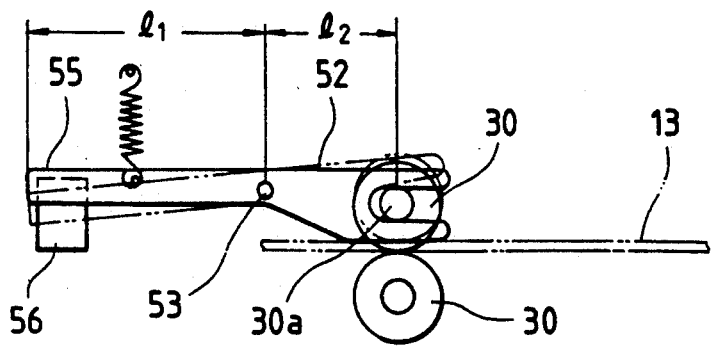
FIG. 2 is a sectional view showing a detection mechanism for detecting a thickness of a sheet, arranged at regist rollers incorporated in the laminating apparatus of FIG. 1.

First of all, the details of the paired regist rollers 30 will be explained with reference to FIG. 2 showing a sheet thickness detecting mechanism arranged at the regist rollers as an elevational view. As shown, a sheet thickness detecting lever 52 is engaged, at its one end, by a shaft 30a of one of the paired regist rollers 30. The sheet thickness detecting lever 52 is pivoted around a rotary shaft 53 when the sheet 13 enters into the nip between the regist rollers. A lever flag 55 is provided on the sheet thickness detecting lever 52, and lengths shown (lever lengths) $l_1$, $l_2$ are set to have a relation $l_1 > l_2$, so that the shifting amount of the regist roller 30 is converted into an amplified shifting amount of the lever flag 55. A sheet thickness detecting sensor 56 such as an optical sensor is arranged in confronting relation to the lever flag 55, so that the shifting amount of the lever flag 55 is detected linearly by the sheet thickness detecting sensor 56, thereby detecting the thickness of the sheet 13 being passed through the nip between the paired regist rollers 30.

Next, the construction of the sheet rolls 36 will be fully explained with reference to FIGS. 3A and 3B.

Figure 3A:
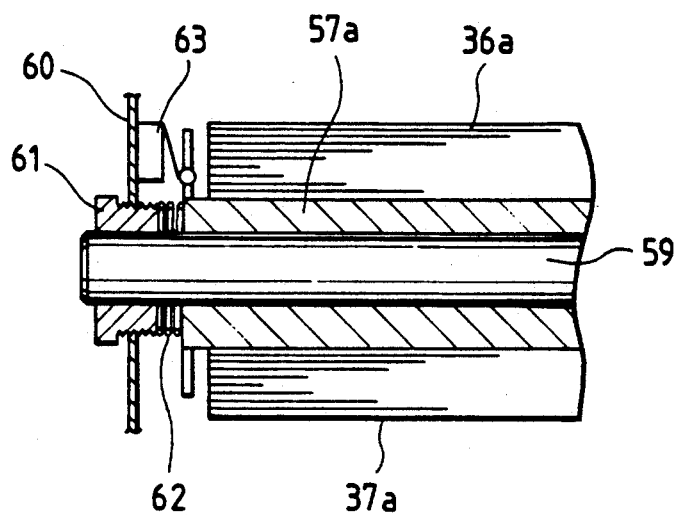
FIGS. 3A and 3B are partial sectional views of a sheet roll used in the laminating apparatus of FIG. 1.
Figure 3B:
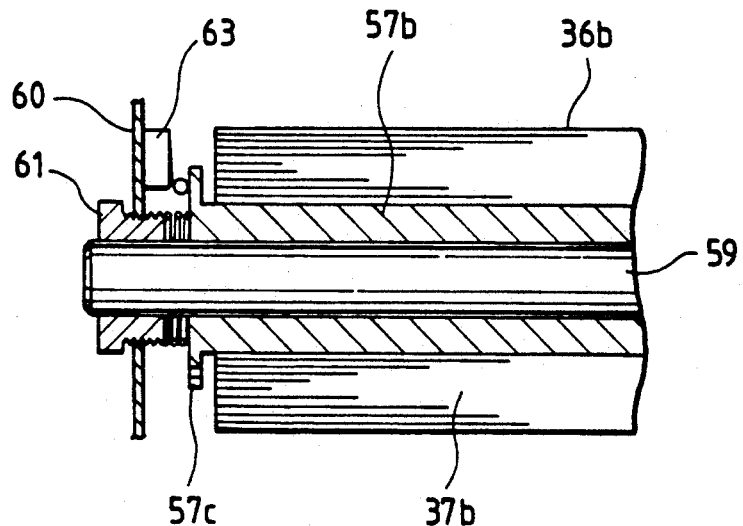

FIGS. 3A and 3B are partial sectional views of the sheet rolls 36a and 36b which are wound around respective cores 57a and 57b. The core 57a can be rotated on a peripheral surface of a roll shaft 59 which is supported by side plates 60 of the laminating apparatus C via a tension adjusting nut 61. A tension spring 62 is disposed between the tension adjusting nut 61 and the core 57a, so that the load on the sheet roll 36 in the sheet unwinding direction can be adjusted on the basis of the tightness of the tension adjusting nut 61.

As shown in FIG. 3A, the sheet roll 36a is constituted by the laminate film 37a having a first thickness, and the sheet roll 36a is mounted on the first core 57a. On the other hand, as shown in FIG. 3B, the sheet roll 36b is constituted by the laminate film 37b having a second thickness, and the sheet roll 36b is mounted on the second core 57b. And, the first core 57a has no flange, whereas the second core is provided at its one end with a flange 57c.

Microswitches 63 secured to the side plate 60 serve to discriminate the cores. When the first core 57a is mounted on the side plates, the microswitch is turned OFF, whereas, when the second core 57b is mounted, the microswitch is turned ON by contacting the flange 57c. In this way, it is possible to discriminate the core 57a from the core 57b, and thus, to discriminate the difference in thickness of the laminate film 37a, 37b. Incidentally, in the illustrated embodiment, while the two laminate films 37a, 37b having different thickness were discriminated from each other, three or more laminate films having different thickness may be discriminated from each other, by changing outer diameters of the flanges and by providing three or more microswitches.

Next, the construction of a drive system will be fully described with reference to FIG. 4.

Figure 4:
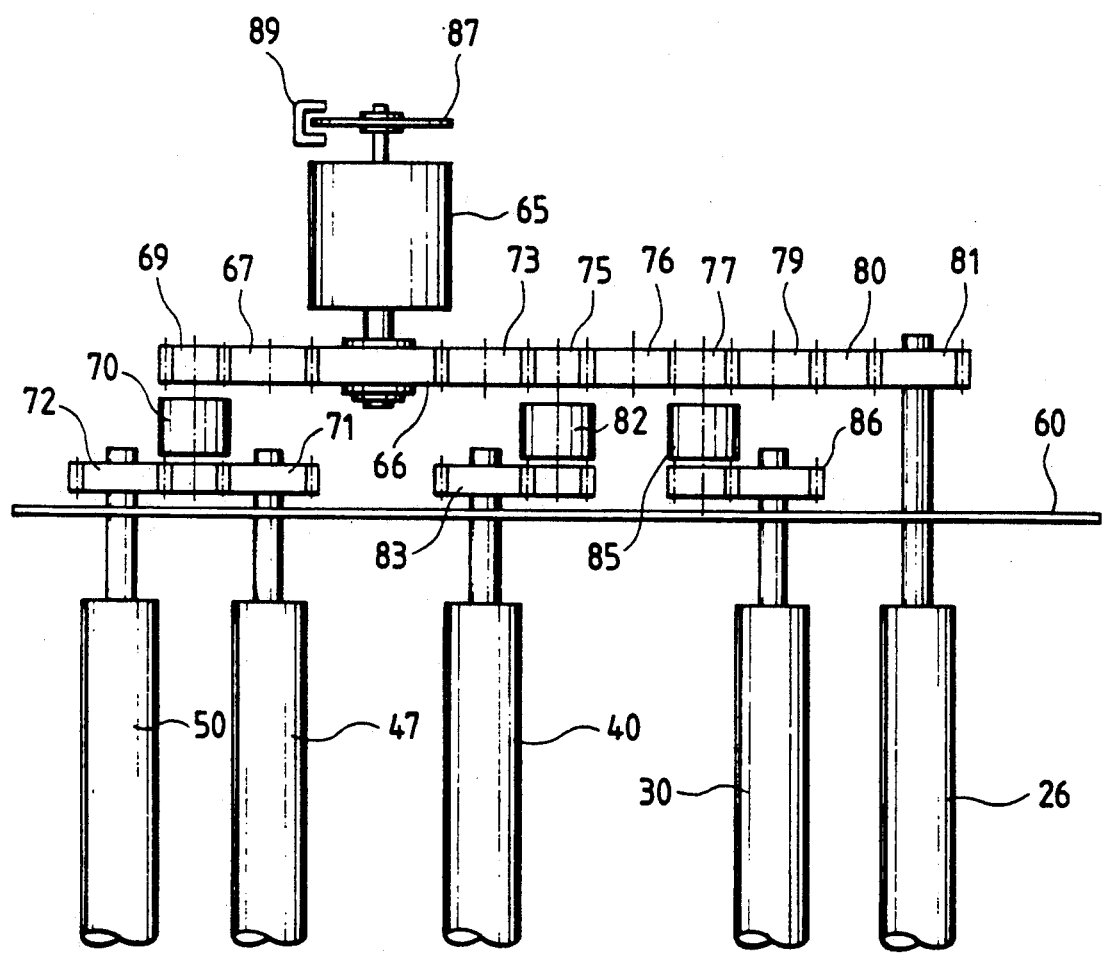
FIG. 4 is a development view showing a drive system of the laminating apparatus of FIG. 1.

FIG. 4 is a development view showing the drive system of the laminating apparatus according to the present invention. In FIG. 4, a main motor 65 has an output shaft on which a motor gear 66 is fixedly mounted. The rotation of the main motor 65 is transmitted to a pull roller gear 71 and a laminate ejector roller gear 72 through a motor gear 62, idle gears 67, 68 and pull roller clutch 70, so that the pull rollers 47a, 47b and the laminate ejector rollers 50a, 50b are rotated. Incidentally, the rotations of the pull rollers 47a, 47b and the laminate ejector rollers 50a, 50b are controlled by ON/OFF of the pull roller clutch 70.

Further, the rotation of the main motor 65 is transmitted to an ejector roller gear 81 via the motor gear 66 and idle gears 73, 75, 76, 77, 79, 80, so that the ejector rollers 19 are rotated.

Further, a pressure roller clutch 82 is disposed on a shaft of the idle gear 75, and the pressure roller clutch 82 is connected to a pressure roller gear 83 so that the rotations of the pressure rollers 40a, 40b are controlled by ON/OFF of the pressure roller clutch 82. Similarly, a regist roller clutch 85 is disposed on a shaft of the idle gear 77, and the regist roller clutch 85 is connected to a regist roller gear 86, so that the rotations of the regist rollers 30a, 30b are controlled by ON/OFF of the regist roller clutch 85.

On the other hand, a clock disc 87 being provided at its periphery with a plurality of slits is fixedly mounted on the output shaft of the main motor 65 opposed to the motor gear 66, and a clock sensor 89 comprising an optical sensor of a permeable type capable of detecting the slit is disposed in the vicinity of the clock disc 87.

Next, the laminate treatment of the sheet 13 ejected from the image forming system by means of the laminating apparatus C according to the present invention will be explained.

First of all, when a laminate ON switch arranged on the operation portion 22 of the laminating apparatus C is depressed, the solenoid (not shown) is activated to shift the flapper 21 to the position shown by the solid line in FIG. 1, with the result that the sheet 13 ejected from the image forming system is directed to the laminate path 29. At the same time, the main motor 65 is rotated to rotate the ejector rollers 26. Incidentally, the paired regist rollers 30, pressure rollers 40a, 40b, pull rollers 47a, 47b and laminate ejector rollers 50a, 50b are stopped since the clutches 85, 82, 70 are in the OFF conditions.

When the leading end of the sheet 13 is detected by the regist pre-sensor 31, the clock sensor 90 (FIG. 5) starts to count the clock number. When the leading end of the sheet 13 abuts against the nip between the regist rollers 30 and thereafter the clocks required for forming a predetermined loop in the sheet are counted by the clock sensor 90, the regist roller clutch 85 is turned ON, with the result that the sheet 13 is fed to the feeding path 32 by means of the regist rollers 30. In this case, the loop in the sheet 13 formed in the laminate path 29 is maintained until the trailing end of the sheet 13 passes through the ejector rollers 19 of the laminating apparatus C. If a distance between the nip of the pressure rollers 40a, 40b and a position of the pre-heaters 39a, 39b nearest to the pressure rollers 40a, 40b is l, when the fact that the leading end of the sheet 13 in the feeding path 32 is shifted to a position ahead of the nip between the pressure rollers 40a, 40b by a distance (l+α) in the feeding path 32 is detected by the counts of the clock sensor 90, the pressure roller clutch 82 is turned ON to start rotation of the pressure rollers 40a, 40b. Incidentally, since a distance between the nip of the pressure rollers 40a, 40b and the nip of the regist rollers 30 is already known, the fact that the leading end of the sheet 13 reaches the position ahead of the nip between the pressure rollers 40a, 40b by the distance ("l+α") can be detected by counting the clocks corresponding to a value obtained by deducting the distance ("l +α") from the known distance, from when the rotations of the regist rollers 30 are started. In this way, the leading end of the sheet 13 is positioned at a position spaced apart from the leading end of the heated portions of the laminate heaters 39a, 39b by a value "α" rearwardly, with the result that the leading end of the sheet 13 can be laminated without fail.

The sheet 13 pinched by the heated upper and lower laminate films 37a, 37b is fed into the nip between the pressure rollers 40a, 40b together with the laminate films, and they are laminate-treated by being pressurized by the pressure rollers 40a, 40b. When the leading end of the sheet 13 so laminate-treated is detected by the lamiante sensor 46, the regist roller clutch 85 and the pressure roller clutch 82 are simultaneously turned OFF, thus stopping the feeding of the sheet 13. At the same time, the cutter motor (not shown) of the cutter unit 42 is activated to shift the cutter 43 downwardly, thus cutting the leading end of the laminate-treated sheet 13. When the cutter 43 is completely retracted at its original upper position after the sheet is cut, the regist roller clutch 85, pressure roller clutch 82 and pull roller clutch 70 are turned ON, thereby rotating the regist rollers 30, pressure rollers 40a, 40b and pull rollers 47a, 47b, respectively.

After the trailing end of the sheet 13 is detected by the regist pre-sensor 31, when the trailing end of the sheet 13 has just passed through the nip between the regist rollers 30, the regist roller clutch 85 is turned OFF, thus stopping the regist rollers 30. A shifting amount of the sheet from when the trailing end of the sheet 13 is detected by the regist pre-sensor 31 to when the trailing end of the sheet 13 passes through the nip between the regist rollers 30 is also measured by the clock sensor 90. When the trailing end of the laminate-treated sheet 13 is detected by the laminate sensor 46, after the distance between the laminate sensor 46 and the cutter 43 is calculated by the clock sensor 90, the pressure roller clutch 82 and pull roller clutch 70 are turned OFF, thus stopping the feeding of the laminate-treated sheet 13. At the same time, the cutter motor is turned ON, whereby the trailing end of the laminate-treated sheet 13 is cut by the cutter 43. After the cutting operation, the pull roller clutch 70 is turned ON to start rotation of the pull rollers 47a, 47b and the laminate ejector rollers 50a, 50b, thereby ejecting the laminate-treated sheet 13 onto the laminate tray 51.

By repeating the above-mentioned sequences, the sheets 13 successively ejected from the printer are laminated successively.

When the laminate treatment is effected regarding the sheet 13, the higher the density of the image on the sheet 13, the more the amount of absorbed heat; thus, in order to perform a better laminate treatment, the heating of the pre-heaters 39a, 39b and the laminate heaters 44a, 44b is controlled in consideration of the amount of heat absorbed by the sheet 13 at the pressure rollers 40a, 40b.

Further, since the thicker the sheet 13 the more the amount of absorbed heat, it is necessary to control the heat of the pre-heaters 39a, 39b and the laminate heaters 44a, 44b which is absorbed by the sheet 13 at the pressure rollers 40a, 40b.

Further, since the thicker the laminate films 37a, 37b the more the amount of heat absorbed by the laminate films 37a, 37b, is also necessary to control the pre-heaters 39a, 39b for heating the laminate films 37a, 37b. The above-mentioned control of the heaters is effected in such a manner that the greater the heat capacities of the laminate films 37a, 37b the higher the heating temperature.

Accordingly, in the laminating apparatus C according to the present invention, the sheet 13 and the laminate films 37a, 37b are heated in accordance with the variation in the density of the image on the sheet 13, thickness of the sheet 13 and the thickness of the laminate films 37a, 37b. To do so, the data from the density detecting sensor 35, sheet thickness detecting sensor 56 and core discriminating switch 63 can be feedback to the printer.

Next, the ON/OFF control and temperature control for the heater 33 will be explained. Incidentally, when the heater 33 is used, since the sheet is dried, it is not required to control the heat of the heaters 39a, 39b, 44a, 44b on the basis of the image density detection.

After the image is formed with ink in the image forming system, the sheet 13 is ejected from the system with the ink adhered thereon and in a wet condition. Thus, if the sheet 13 is laminate-treated while being wet, the moisture is sealed between the upper and lower laminate films 37a, 37b, with the result that bubbles are generated between the laminate films, thus worsening the laminate treatment. To avoid this, it is necessary to previously heat the sheet 13 prior to the laminate treatment to remove the moisture from the sheet.

However, if the sheet is excessively heated, the sheet is curled, which causes the curl and/or wrinkles in the sheet and the films during the laminate treatment. The moisture in the sheet 13 varies in accordance with the image density on the sheet, and the higher the image density the more the laminate treatment will be worsened.

Thus, in the laminating apparatus C according to the present invention, the image density is previously detected by the image density detecting sensor 35 and the heating temperature can be automatically controlled on the basis of the detected image density. That is to say, if the image density is high, the heater temperature is set to be high, whereas, if the image density is low, the heater temperature is set to be low. Incidentally, although the image forming systems include a system wherein an image is formed with toner without using the ink, in such a system, since the sheet is ejected after it is dried, it is not required for pre-heating the sheet prior to the laminate treatment. Thus, in this case, an operator may keep the heater activating switch on the operation portion 22 in an OFF condition.

Next, the above-mentioned control and operation will be fully described with reference to a block diagram shown in FIG. 5. Incidentally, here, the case where the heater 33 is not provided will be explained.

Figure 5:
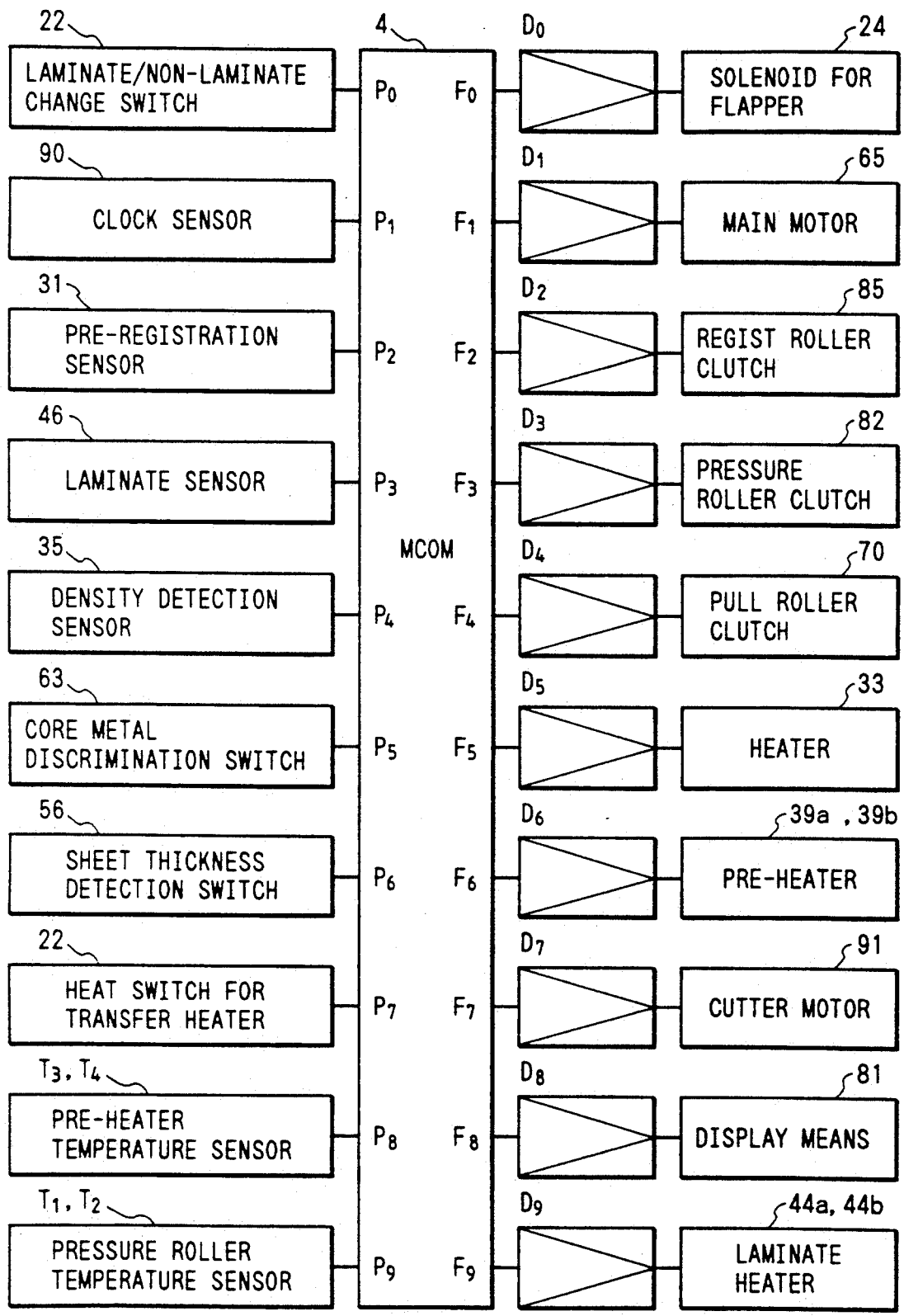
FIG. 5 is a block diagram of a control circuit of the laminating apparatus of FIG. 1.

FIG. 5 shows a block diagram illustrating a control circuit for performing the above-mentioned operation. In FIG. 5, the control circuit is constituted by a well-known one-chip microcomputer 4 (referred to as "MCOM" hereinafter) incorporating ROM, RAM and the like. Input ports $P_0 1$–$P_9$ are connected to the above-mentioned laminate/non-laminate change-over switch 22, clock sensor 90 for counting the amount of rotation of the main motor 65 and the shifting amounts of the rollers 26, 30, 40a, 40b, 47a, 47b, 50a, 50b, pre-registration sensor 31 positioned ahead of the regist rollers and adapted to detect the leading and trailing ends of the sheet 13, laminate sensor 46 disposed between the pressure rollers 40a, 40b and the cutter unit 42 and adapted to detecting the leading and trailing ends of the sheet 13 after the laminate treatment, image density detecting sensor 35 for detecting the density of the image on the sheet 13 ejected from the image forming system, core discrimination switches 63 for discriminating the kind of the core (metal) relating to the sheet rolls 36a, 36b to discriminate the thickness of the laminate films 37a, 37b, sheet thickness detecting sensor 56 for detecting the thickness of the sheet 13 being passed through the regist rollers 30 by detecting the shifting amount of the regist roller, ON/OFF switch 22 for the heater 33, temperature sensors $T_3$, $T_4$ for detecting the temperatures of the pre-heaters 39a, 39b, and temperature sensors $T_1$, $T_2$ for detecting the temperatures of the pressure rollers 40a, 40b, respectively.

From output ports $F_0$–$F_7$ of the MCOM 4, output signals regarding the ON/OFF operation of the solenoid 24 for the flapper 21 capable of switching the laminate/non-laminate paths, ON/OFF operation of the main motor 65, the main density detected by the density detecting sensor 35, thickness of the laminate films detected by the core discriminating switches 63, control of the rotational speeds of the rollers pre-set on the basis of the change in the thickness of the sheet detected by the sheet thickness detecting sensor 56, ON/OFF operation of the regist roller clutch 85 for activating and deactivating the regist rollers 30, ON/OFF operation of the pressure roller clutch 82 for activating and deactivating the pressure rollers 40a, 40b, ON/OFF operation of the pull roller clutch 70 for activating and deactivating the pull rollers 47a, 47b and laminate ejector rollers 50a, 50b, ON/OFF operation of the heater 33 for heating the sheet 13 prior to the laminate treatment and control of the heater temperature to set it to a predetermined value preset on the basis of the change in the image density on the sheet 13 detected by the density detecting sensor 35, ON/OFF operation of the pre-heaters 39a, 39b for pre-heating the laminate films 37a, 37b and temperature control of the surfaces of the pre-heaters 39a, 39b pre-set on the basis of the change in the image density detected by the density detecting sensor 35, the thickness of the laminate films discriminated by the core discriminating switches 63 and the thickness of the sheet detected by the sheet thickness detecting sensor 56, ON/OFF operation of the cutter motor 91 for performing the cutting operation for the laminate-treated sheet 13, operation for displaying the laminate treatment condition by means of a display means 91, and ON/OFF operation of the laminate heaters 44a, 44b for heating the pressure rollers 40a, 40b and temperature control of the laminate heaters 44a, 44b pre-set on the basis of the change in the image density detected by the density detecting sensor 35, the thickness of the laminate films discriminated by the core discriminating switches 53 and the thickness of the sheet detected by the sheet thickness detecting sensor 56, respectively, are outputted via drivers $D_0$–$D_7$, respectively.

The reading of the input signals or ON/OFF of the loads, and the controls to the various set values are carried out on the basis of the program stored in the ROM of the MCOM 4.

Figure 6:
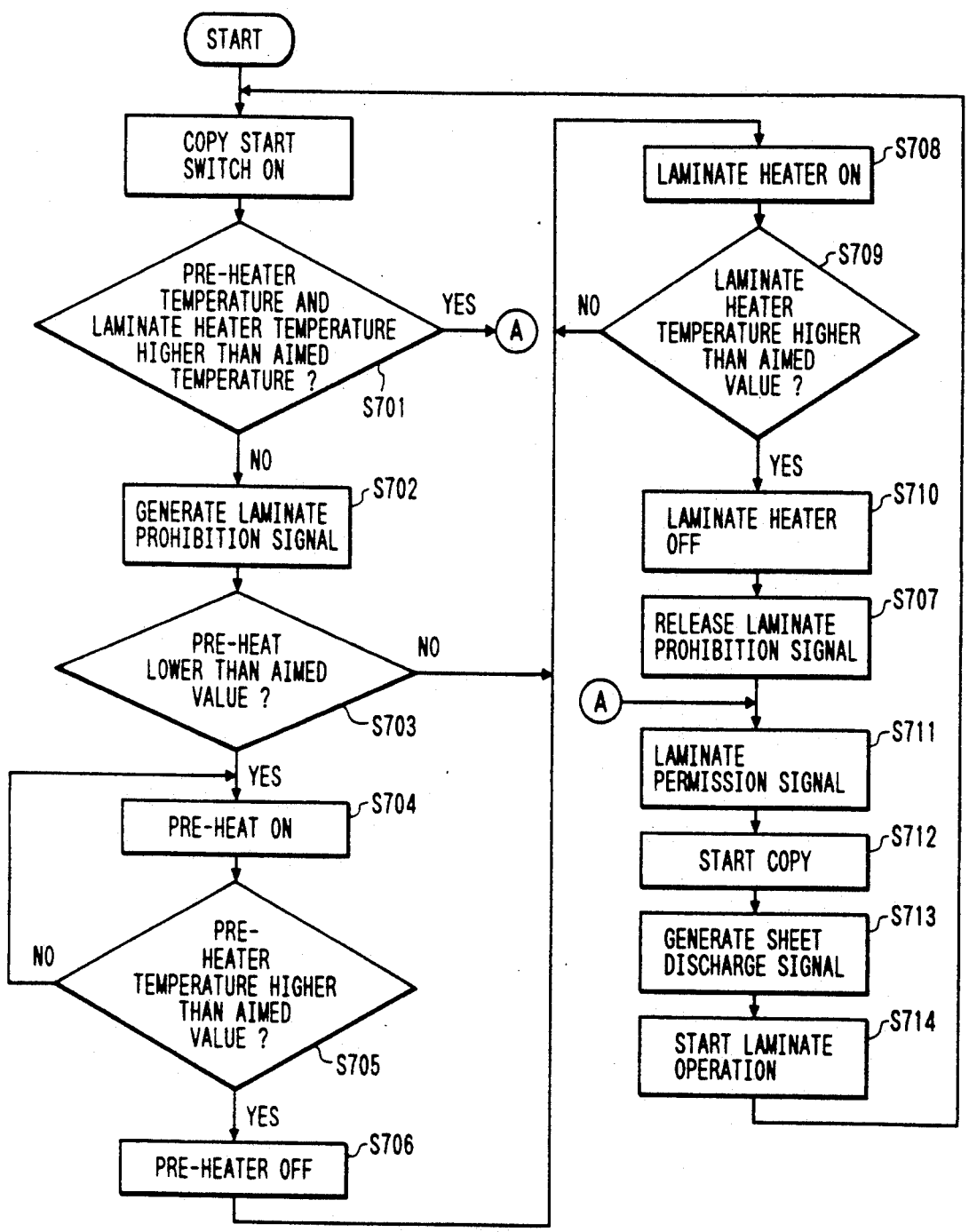
FIG. 6 is a flow chart showing an example of control of the laminating apparatus of FIG. 1.

FIG. 6 shows a flow chart of the control regarding the illustrated embodiment.

When the operator depresses a start switch of the image forming system, the temperatures of various heaters in the laminating apparatus are detected by the temperature sensors $T_1$, $T_2$, $T_3$, $T_4$ and these temperatures are compared with preselected aimed temperatures (step S701). If the temperatures are higher than the aimed temperatures, a laminate permission signal is generated and is sent to the image forming system (step S711). Then, the copying operation is started (step S712), and the laminate treatment operation is started at the same time when the sheet 13 is ejected from the image forming system (steps S713, S714).

In the step S701, if the temperature detected by the sensor $T_1$, $T_2$, $T_3$ or $T_4$ is lower than the corresponding aimed temperature, a laminate prohibition signal is generated (step S702), and then, it is judged whether the pre-heat temperatures of the pre-heaters 39a, 39b are lower than their aimed temperatures (step S703). If the pre-heat temperatures are lower than the aimed temperatures, the pre-heaters 39a, 39b are activated (step S704) to heat the pre-heaters up to their aimed temperatures and then are deactivated (steps S705, S706). Thereafter, the laminate heaters 44a, 44b are turned ON (step S708) to heat them up to their aimed temperatures and then are turned OFF (steps S709, S710). Then, a laminate prohibition release signal is sent to the image forming system (step S707). Thereafter, the laminate permission signal is generated (step S711) to send it to the image forming system, thus starting the copying operation (step S712). After the sheet is ejected (step S713), the laminate treatment operation is started (step S714).

The aimed temperatures are previously set in accordance with the thickness of the sheet, image density, thickness of the laminate films and the like, and appropriate temperatures are selected on the basis of the data from the density detecting sensor 35, sheet thickness detecting sensor 56 and core discriminating switches 63. The heaters 39a, 39b, 44a, 44b are controlled on the basis of the selected temperatures.

Incidentally, in the illustrated embodiment, when a plurality of sheets are used and are laminate-treated, since the image density and the thickness of a first sheet are not detected, the aimed temperatures regarding the first sheet are set only on the basis of the thickness of the laminate films. On the other hand, with respect to second, third sheets and so on, the aimed temperatures may be set on the basis of not only the thickness of the laminate films but also the thickness and the image density of the previous sheet.

Figure 7:
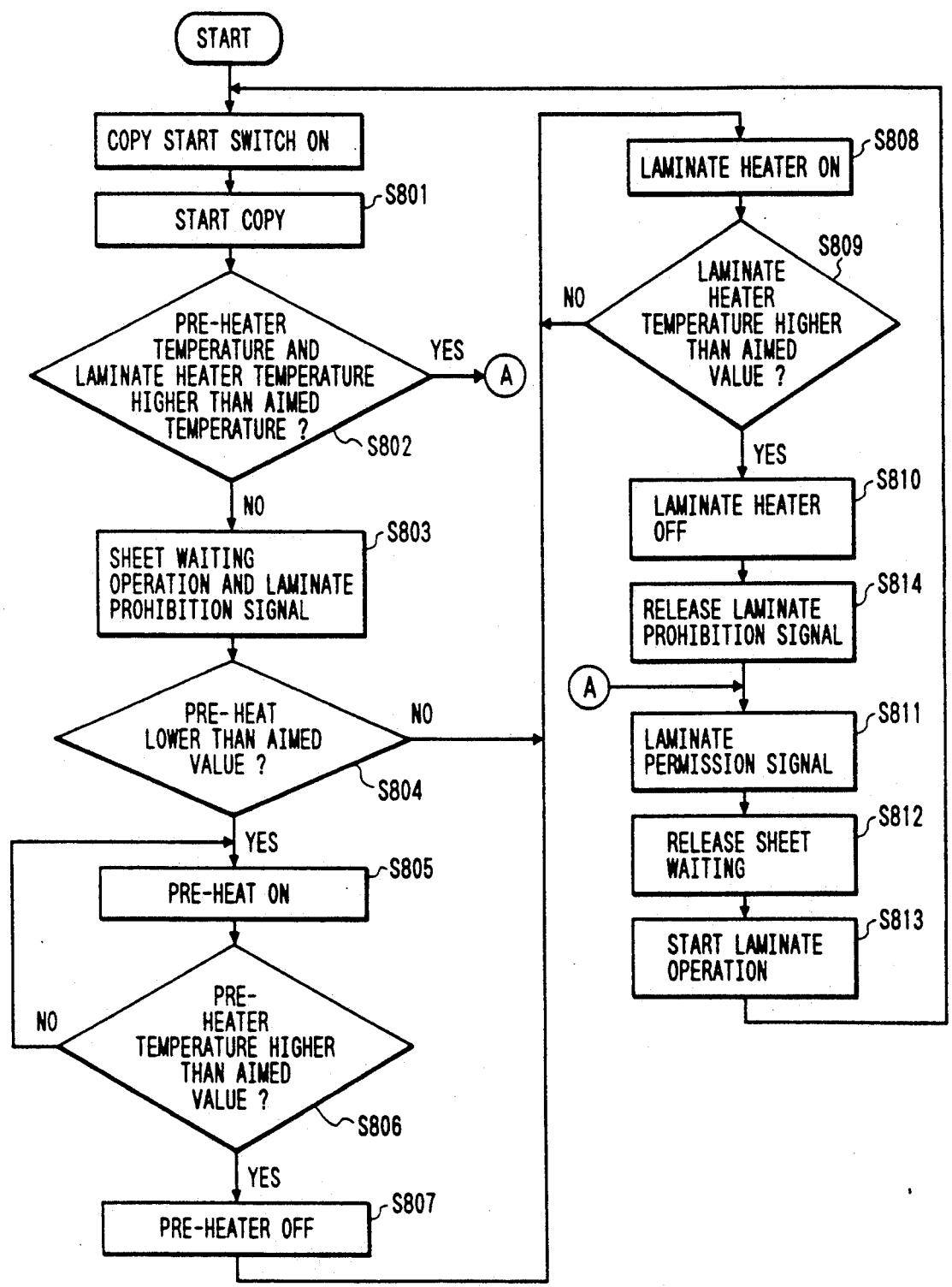
FIG. 7 is a flow chart showing another example of control of the laminating apparatus of FIG. 1.

Next, an example of another control will be explained with reference to a flow chart shown in FIG. 7.

In this embodiment, when the start switch of the image forming system is turned ON, the copying operation is started. In this case, if the temperatures of the heaters 39a, 39b, 44a, 44b do not reach the respective aimed temperatures, the copied sheet is held up, and, when the aimed temperatures are reached, the laminate treatment operation is started. Thereby, it is possible to save time from the copying operation to the laminate treatment operation.

More particularly, when the start switch is turned ON, the copying operation is started (step S801). The temperatures of the heaters 39a, 39b, 44a, 44b are detected by the temperature sensors $T_1$, $T_2$, $T_3$, $T_4$, and these temperatures are compared with preselected aimed temperatures (step S802). If the temperatures are higher than the aimed temperatures a laminate permission signal is generated and is sent to the image forming system (step S811). And, if the copied sheet 13 is in a waiting condition, the sheet waiting condition is released (step S812) to eject the sheet 13 out of the image forming system. At the same time, a laminate treatment operation is started (step S813).

If the temperatures detected by the temperature sensors $T_1$, $T_2$, $T_3$, $T_4$ are lower than the aimed temperatures, the copied sheet 13 is waits (step S803). The waiting position of the sheet may be selected so that the leading end of the sheet 13 abuts against the regist rollers 30 in the laminate path 29. Alternatively, the sheet 13 may wait in the image forming system B. Alternatively, the sheet may wait by stacking the sheets.

At the same time as the sheet is waiting, a laminate prohibition signal is generated. And, first of all, it is judged whether the pre-heat temperatures of the pre-heaters 39a, 39b are lower than their aimed temperatures (step S804). If the pre-heat temperatures are lower than the aimed temperatures, the pre-heaters 39a, 39b are turned ON (step S805) to heat the pre-heaters up to their aimed temperatures and then are turned OFF (steps S806, S807). Then, the laminate heaters 44a, 44b are turned ON (step S808) to heat them up to their aimed temperatures and then are turned OFF (steps S809, S810). Then, a laminate prohibition release signal (step S814) is sent to the image forming system. Thereafter, the laminate permission signal is generated (step S811), the sheet waiting condition is released (step S812) and the laminate treatment operation is started (step S813).

In the previous embodiment, while the aimed temperatures were set in accordance with the thickness and image density of the previous sheet, and the thickness of the laminate films, in this embodiment, the aimed temperatures may be set on the basis of the data from various detection means arranged in the image forming system, as well as by using the above-mentioned setting method.

Incidentally, in the above-mentioned embodiments, when the laminate treatment is prohibited, the drive system in the image forming system should be stopped.

Next, another embodiment will be explained. This embodiment differs from the embodiment shown in FIG. 1 in the construction for sandwiching the copied sheet with the laminate films and for performing the laminate treatment by heat and pressure.

Figure 8:
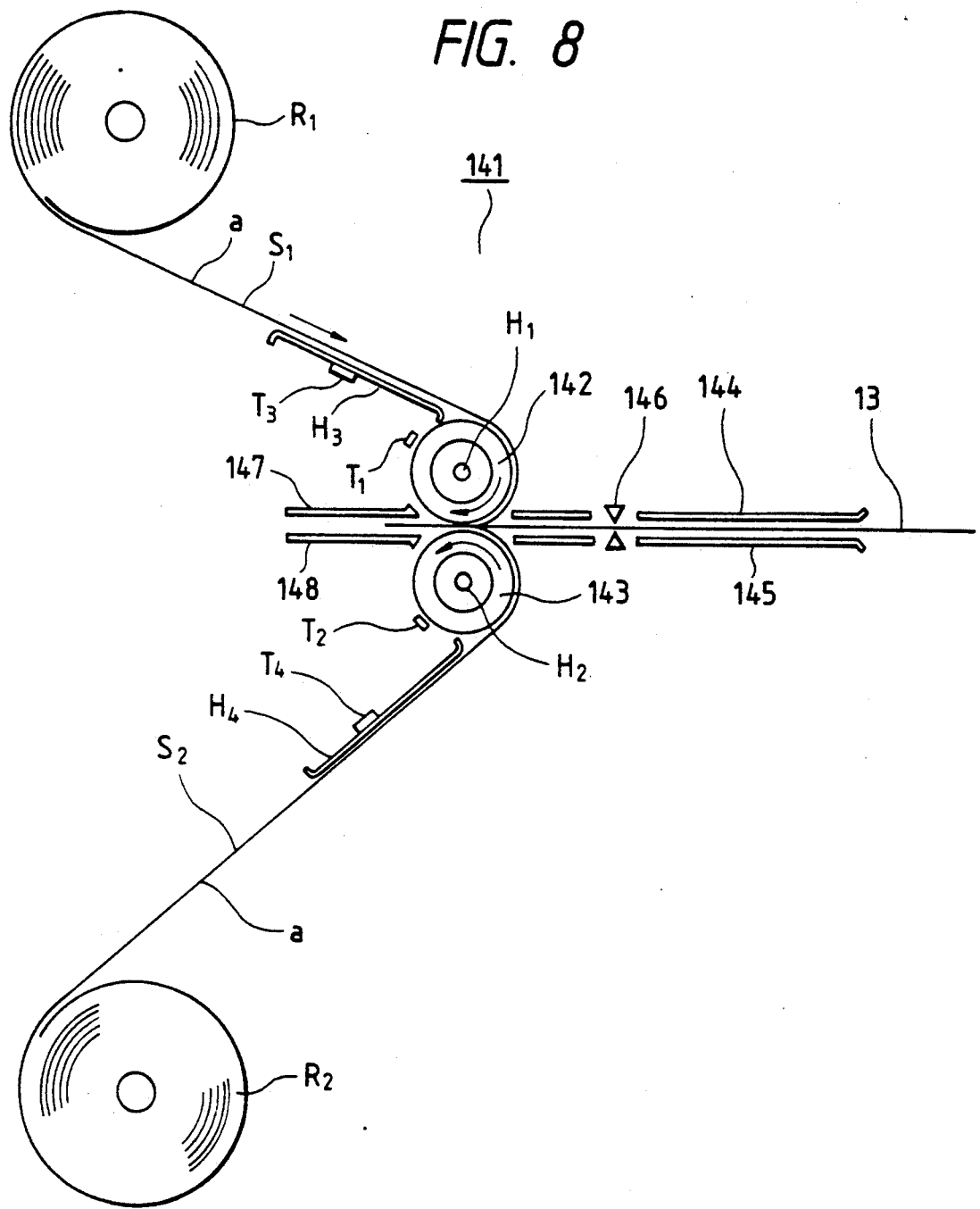
FIG. 8 is an elevational sectional view of a main portion of a laminating apparatus according to another embodiment of the present invention.

FIG. 8 shows another embodiment and illustrates a laminate treatment portion 141 of a laminating apparatus C according to that embodiment.

In FIG. 8, a drive pressure roller 142 is driven in a direction shown by the arrow by means of a drive means (not shown). A driven pressure roller 143 is pressed against the drive pressure roller 142 with an appropriate force to be driven by the drive pressure roller 142 in a direction shown by the arrow.

At a right side of these pressure rollers 142, 143, there are disposed horizontal guide plates 144, 145 for guiding the sheet 13, and an interrupter 146 for detecting the sheet 13 is arranged at an intermediate portion of the guide plates 144, 145. At a left side of the pressure rollers 142, 143, there are disposed horizontal guide plates 147, 148 for guiding the laminate-treated sheet 13.

A sheet roll $R_1$ of a two-layer laminate film $S_1$ on an upper surface a of which heat-fusible adhesive is coated is rotatably supported at an upper and left side of the pressure rollers 142, 143, and a sheet roll $R_2$ of a two-layer laminate film $S_2$ on a lower surface a of which heat fusible adhesive is coated is rotatably supported at a lower and left side of the pressure rollers 142, 143.

Heaters $H_1$, $H_2$ are attached to shafts of the pressure rollers 142, 143, respectively, and planer heaters $H_3$, $H_4$ are disposed along a lower surface of the adhesive film $S_1$ and an upper surface of the adhesive film $S_2$, respectively. Further, thermistors $T_1$-$T_4$ for detecting temperature by using electrical resistance are mounted on the respective heaters $H_1$-$H_4$.

Figure 9:
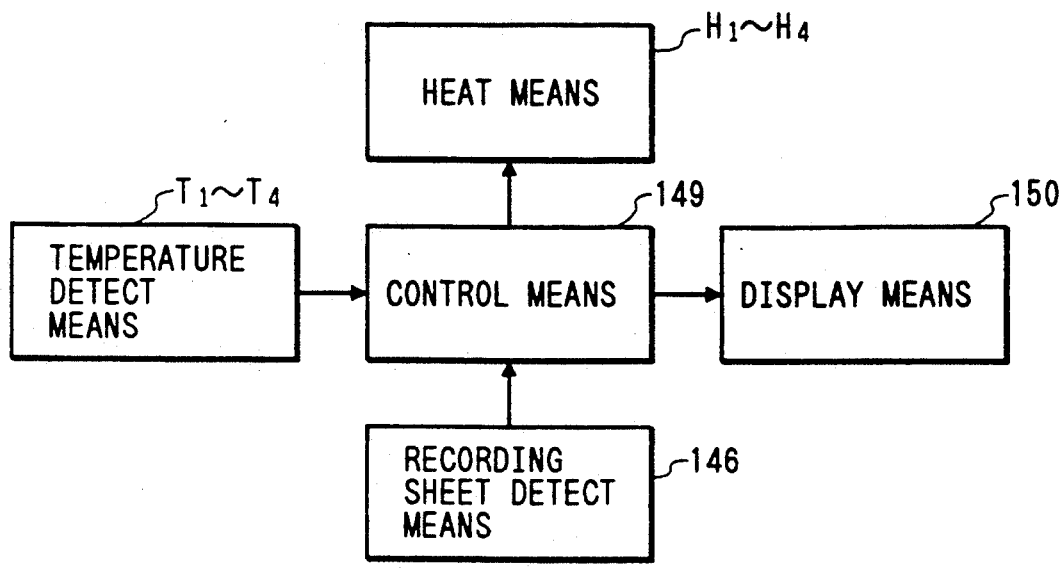
FIG. 9 is a control block diagram of the laminating apparatus of FIG. 8.

Next, the construction of the control system will be explained with reference to a control block diagram shown in FIG. 9.

The temperatures of heat means comprising the heaters $H_1$-$H_4$ are measured by temperature detect means comprising the thermistors $T_2$-$T_4$, and the temperatures of the heat means $H_1$-$H_4$ are controlled by feeding the measured signals to a control means 149. When the sheet 13 is detected by sheet detect means comprising the interrupter 146, the control means receives the detect signal to change the control temperature. Further, when the electric power source is turned ON, the control means provides a display on display means 150 via an LED and the like. The control may display the information such as "under waiting condition", "completion" and the like.

Figure 10:
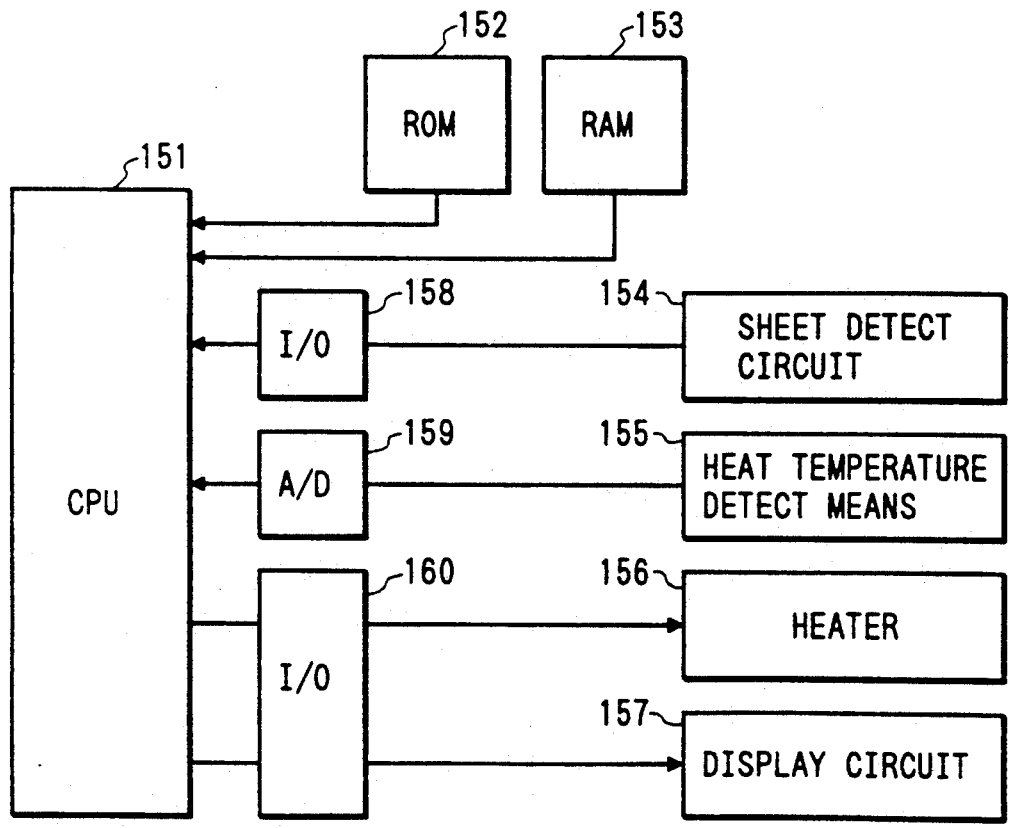
FIG. 10 is a block diagram of a control circuit of the laminating apparatus of FIG. 8.

Next, the construction of the control circuit will be explained with reference to FIG. 10. The reference numeral 151 denotes a central processing unit (CPU); 152 denotes a read only memory (ROM) in which the control program is stored; and 153 denotes a random access memory (RAM) in which input data (data obtained from signals) is stored. A sheet detection circuit 154 is connected to an inlet port 158, and the loads such as the heaters 156 and display circuit 157 are connected to an outlet port 160. Further, a heater temperature detection circuit 155 is connected to an A/D conversion input portion 159, so that the serial voltage change signals representative of the temperatures of the heaters $H_1$–$H_4$ are converted into digital signals, which are sent to the CPU 151.

In this way, the signals from the inlet port 158 and the A/D conversion input portion 159 are stored in the RAM 153 as the input data, and, on the basis of such data, the required commands are sent from the outlet port 160 to the heaters $H_1$–$H_4$ and the display circuit in the control program stored in the ROM 152.

Next, the laminate treatment operation in the illustrated embodiment will be fully explained with reference to FIGS. 11 to 14.

Figure 11:
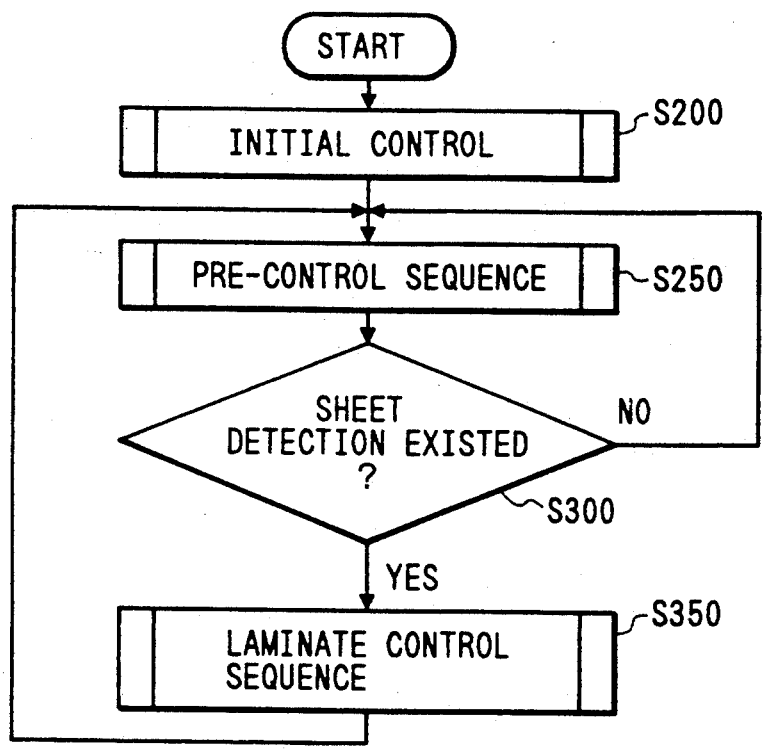
FIG. 11 is a flow chart showing the control of the laminating apparatus of FIG. 8.

FIG. 11 is a flow chart showing the whole operation.

First of all, when the electric power source is turned ON, a predetermined initial control is effected (step S200). Thereafter, a pre-heat control sequence (step S250) is effected until the sheet 13 is detected (step S300). In the step S300, if the sheet 13 is detected, the program goes to a step S350, where a laminate control sequence is effected until the laminate treatment operation is finished. If the absence of the sheet 13 is detected after the laminate treatment operation is finished or during the laminate treatment operation, the program returns to the step S250.

The above control is repeatedly effected.

Next, each of the control sequences will be described.

Figure 12:
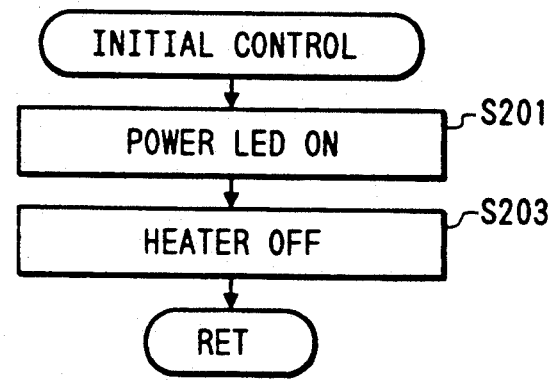
FIG. 12 is a flow chart showing an initial control sub-routine of the flow chart of FIG. 11.

FIG. 12 is a flow chart of a sub-routine for performing the initial control. When the power source is turned ON, the power LED ON condition is displayed on the display means 150 (step S201). In this case, the heaters $H_1$–$H_4$ are kept in OFF conditions (step S203).

Figure 13:
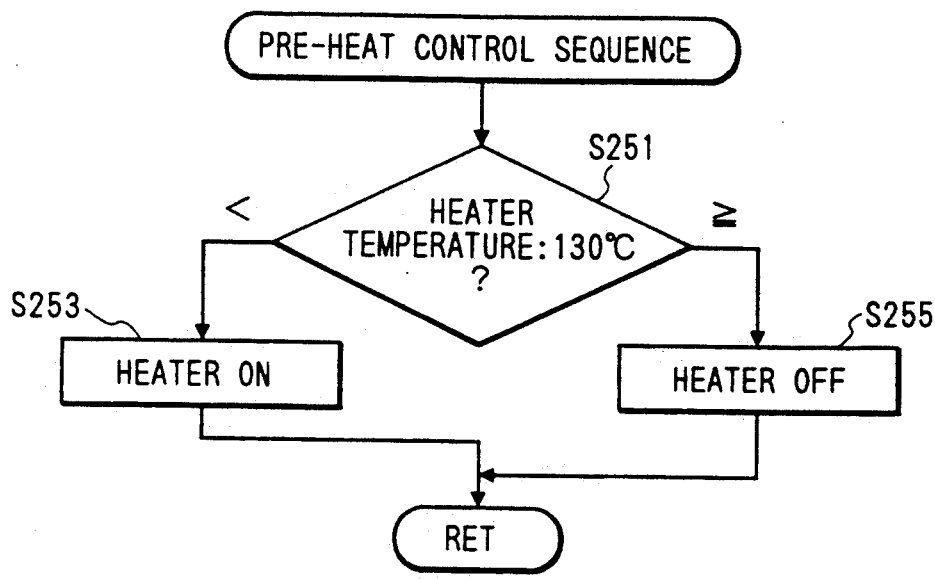
FIG. 13 is a flow chart showing a pre-heat control sub-routine of the flow chart of FIG. 11.

Next, in the pre-heat control sequence shown in FIG. 13, the pre-heat control is effected as the preparation for the laminate treatment operation. In the illustrated embodiment, the preparation temperature for the laminate treatment operation is set to 130° C.

First of all, in a step S251, it is judged whether the temperatures detected by the thermistors $T_1$–$T_4$ are higher than 130° C. (step S251). If the temperatures of the heaters $H_1$–$H_4$ are lower than turned ON (step S253) to heat the heaters $H_1$–$H_4$.

On the other hand, in the step S251, if the temperature of any one of the heaters $H_1$–$H_4$ is higher than or equal to 130° C., the heater is turned OFF (step S255) to deviate the heat from that heater. That is to say, when the sheet 13 is not detected by the interrupter 146, the temperatures of the heaters $H_1$–$H_4$ are adjusted to 130° C.

Figure 14:
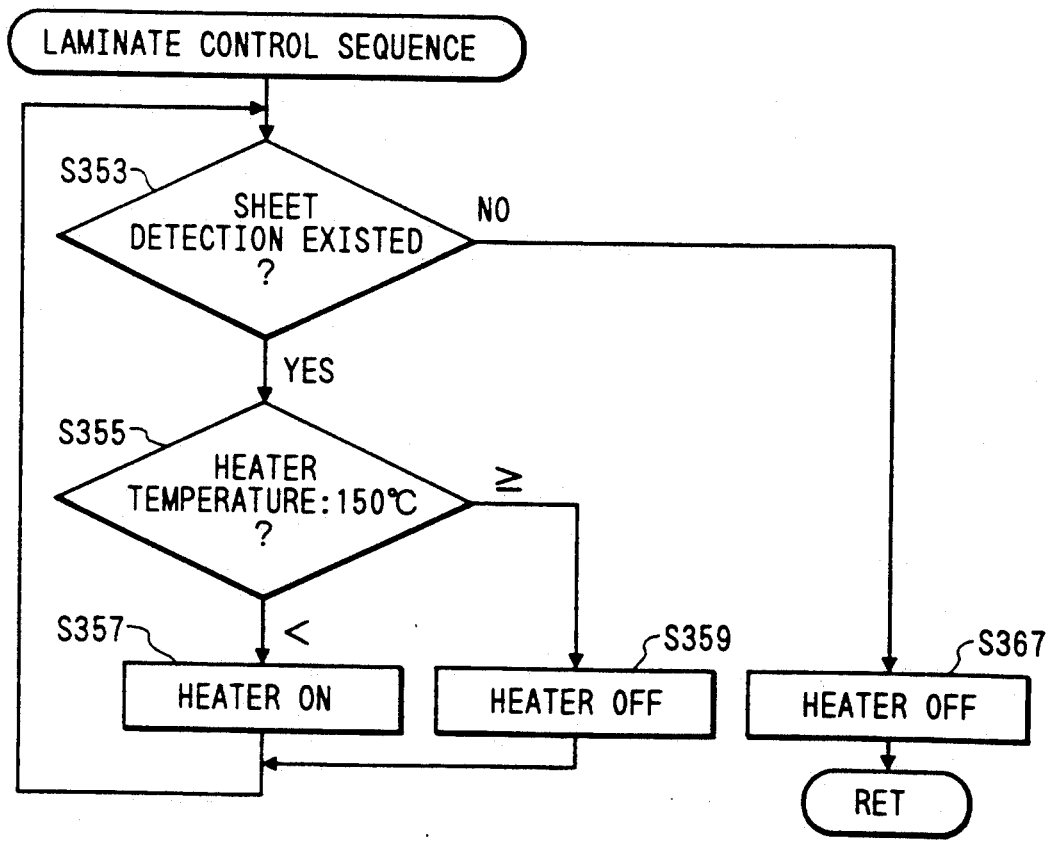
FIG. 14 is a flow chart showing a laminate control sub-routine of the flow chart of FIG. 11.

Next, the laminate control sequence shown in FIG. 14 is started when the sheet 13 is detected during the pre-heat control sequence. That is to say, if the sheet 13 is not detected by the interrupter 146 (step S353), the heaters $H_1$–$H_4$ are naturally kept in the OFF conditions (step S367).

When the sheet 13 is detected by the interrupter 146 (step S353), if the temperatures of the heaters $H_1$–$H_4$ are lower than a temperature (150° C. in the illustrated embodiment) sufficient to melt the heat-fusible adhesive (step S355), the heaters $H_1$–$H_4$ are turned ON (step S357). As the temperatures of the heaters $H_1$–$H_4$ increase above 150° C., when the control means 149 receives the signals from the thermistors $T_1$–$T_4$, the heaters $H_1$–$H_4$ are turned OFF (step S359) on the basis of the command from the control means. As long as the sheet 13 is set in the laminating apparatus C, the steps S353, S355, S357 and S359 are repeated continuously.

In this way, by adjusting the temperatures of the heaters $H_1$–$H_4$ to 150° C. during the laminate treatment operation, it is possible to perform the complete laminate treatment.

As mentioned above, in the illustrated embodiment, since the temperatures of the heaters $H_1$–$H_4$ are maintained in the low value during the preparation for the laminate treatment, and the temperatures of the heaters $H_1$–$H_4$ are maintained in the high value during the laminate treatment operation to perform the complete laminate treatment, the safety and service life of the laminating apparatus C can be improved and the consumption power can be reduced, thus improving the efficiency of the apparatus C.

Next, a further embodiment will be explained with reference to a flow chart shown in FIG. 15.

In this embodiment, after the power source is turned ON, the pre-heat control sequence (initial control step S200) is effected for a long time, and a wait timer is provided for preventing the power loss due to the heaters $H_1$–$H_4$ which have the higher power consumption and for improving the safety of the apparatus. Accordingly, after the power source is turned ON, the initial control sequence (step S200) is effected, as in the previous embodiment. However, in this embodiment, then, the wait timer for measuring a time until the sheet 13 is detected is started (step S301).

Then, the pre-heat control sequence is effected in a step S250, and, in a step S303, it is judged whether the wait timer exceeds a preselected time (10 minutes in the illustrated embodiment). If not, the sheet 13 is detected in a step S300, as in the previous embodiment. If the sheet 13 is not detected, the program returns to the step S350. On the other hand, if the sheet 13 is detected, the program goes to a step S350 where the laminate control sequence is effected. After the laminate treatment operation is finished, the wait timer is clear (step S305), and then the wait timer is re-started (step S307). Then, the program returns to the step S250.

In the step S303, if the wait timer exceeds the preselected time, the heaters $H_1$–$H_4$ are turned OFF (step S309), and the program is stopped (step S311). In this case, in order to re-use the laminating apparatus C, it is necessary to reset the power source.

Figure 16:
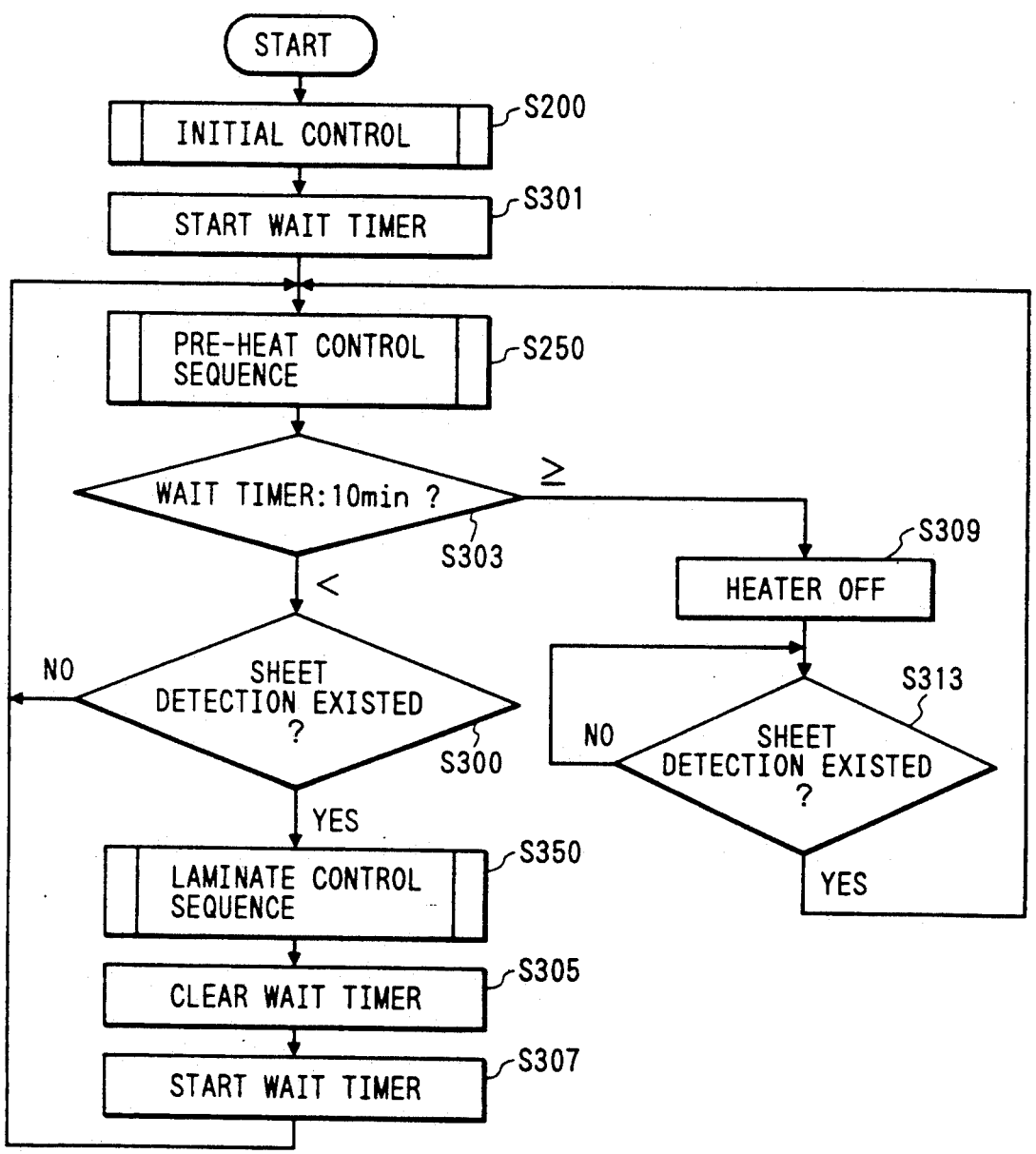
FIG. 16 is a flow chart showing a further control of the laminating apparatus of FIG. 8.

Next, a further embodiment will be explained with reference to FIG. 16.

Figure 15:
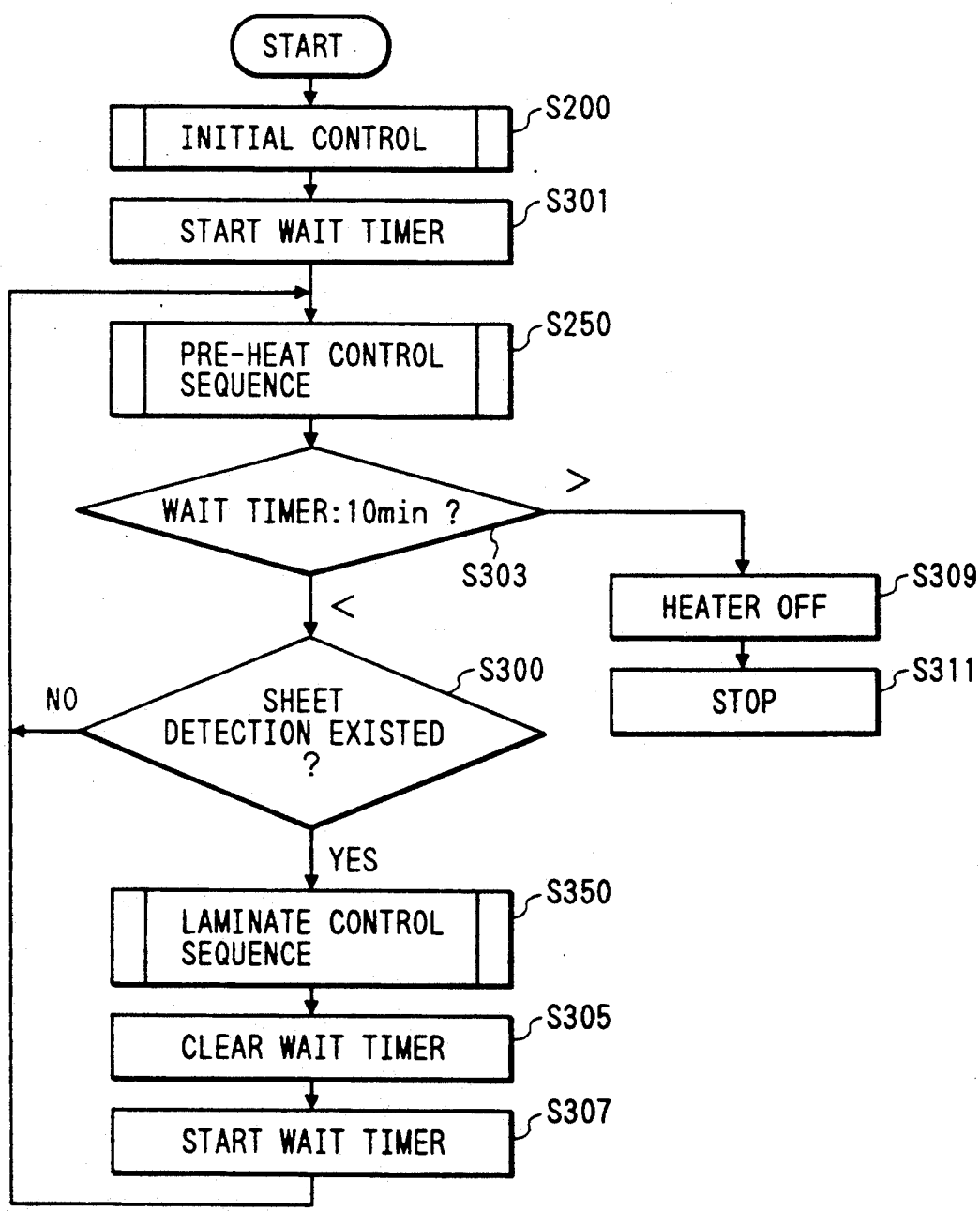
FIG. 15 is a flow chart showing another control of the laminating apparatus of FIG. 8.

In the embodiment shown in FIG. 15, if the sheet 13 was not detected after the wait timer exceeded the preselected time (for example, 10 minutes), the apparatus C was stopped. Thus, since the power source was turned OFF, it was necessary to reset the power source if the apparatus C was re-used after a certain time has been elapsed. To the contrary, in this embodiment, if the wait timer exceeds a preselected time (10 minutes in this embodiment) in the step S303, the program goes to the step S309 where the heaters $H_1$-$H_4$ are turned OFF, as in the previous embodiment. Thereafter, the program goes to a step S313 which is repeated until the sheet 13 is detected by the interrupter 146, thus keeping the heaters $H_1$-$H_4$ in the OFF condition. However, if the sheet 13 is detected, the program returns to the step S250, thus performing the normal laminate treatment operation. That is to say, it is possible to continue the normal laminate treatment operation without resetting the power source, and to reduce the power consumption and to ensure the safety of the laminating apparatus C.

Next, a still further embodiment will be explained.

Figure 17:
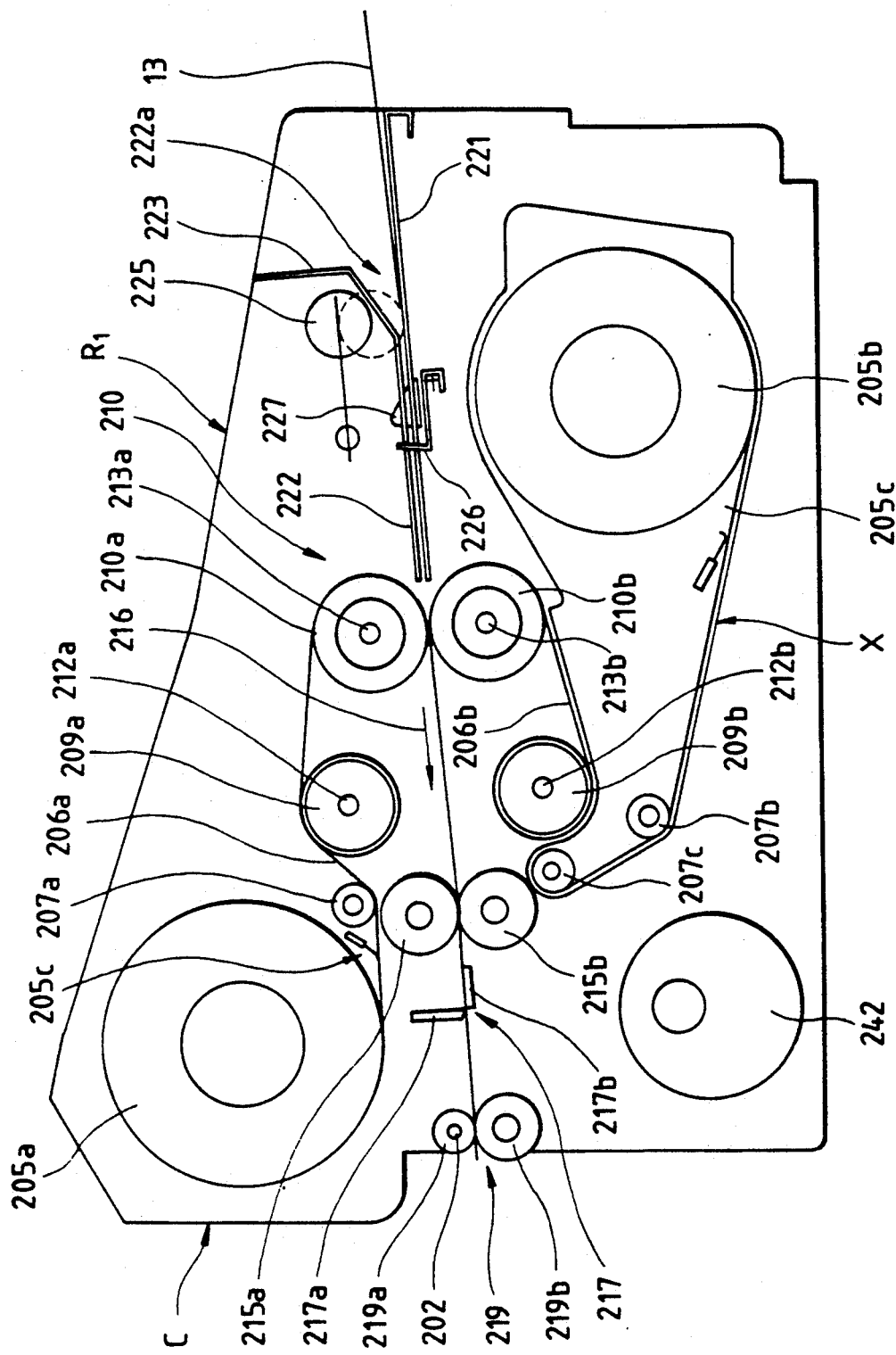
FIG. 17 is an elevational sectional view of a laminating apparatus according to a further embodiment of the present invention.

In FIG. 17, a laminate film roll 205a of a laminate film 206a is disposed within a laminating apparatus C at an upper portion thereof, and the laminate film 206a unwound from the laminate film roll 205a are wound around a tension roller 207a, pre-heat roller 209a and pressure/heat roller (heating block) 210a acting as a laminate roller successively. On the other hand, a laminate film roll 205b of a laminate film 206b is disposed within the laminating apparatus C at a lower portion thereof, and the laminate film 206b unwound from the laminate film roll 205b are wound around tension rollers 207b, 207c, pre-heat roller 209b and pressure/heat roller 210b urged against the pressure/heat roller 210a successively.

The tension rollers 207a, 207c act as film holding rollers so that the laminate films 206a, 206b contact with the pre-heat rollers 209a, 209b by predetermined length, and the slack of the laminate films 206a, 206b between the pre-heat rollers 209a, 209b and the pressure/heat rollers 210a, 210b and the adhesion between the laminate films are prevented. Further, a laminate film roll unit X which can removably mount the laminate film roll 205b on the laminating apparatus C is constituted by the laminate film roll 205b, tension rollers 207b, 207c and like.

Pre-heaters 12a, 12b for heating the pre-heat rollers 209a, 209b are disposed at centers of the pre-heaters, and laminate heaters 213a, 213b acting as heat means for heating the pressure/heat rollers 210a, 210b are disposed at centers of the pressure/heat rollers. The heat means comprises the laminate heaters 213a, 213b, and the pressure/heat rollers (heating blocks) 210a, 210b for transmitting the heat of the laminate heaters 213a, 213b to the laminate films 206a, 206b. The surface temperatures of the pre-heat rollers 209a, 209b are detected by a pre-heat roll temperature sensor 259 (FIG. 20) and the surface temperature of the pressure/heat rollers 210a, 210b are detected by a pressure roller temperature sensor 256.

At a downstream side of the paired pressure/heat rollers 210a, 210b, a pair of pull rollers 215 comprising an upper roller 215a and a lower roller 215b urged against the upper roller are disposed and serve to pull the laminate films 206a, 206b overlapped at the pressure/heat rollers 210a, 210b and the sheet 13 (described later) rearwardly in a direction shown by the arrow 216. At a downstream side of the paired pull rollers 215, there are arranged a cutter unit 217 and a pair of ejector rollers 219. The cutter unit 217 comprises a cutter 217a and a die 217b and serves to cut trailing ends of the laminate films 206a, 206b and of the sheet 13.

At an upstream side of the paired pressure/heat rollers 210, there are disposed a sheet supply support 221 on which the sheets 13 are stacked, and an upper guide plate 223 cooperating with the sheet supply support 221 to form a sheet supply path 222. A pick-up roller 225 separably contacting with the sheet supply support 221 and a shutter member 226 for regulating a leading end of the sheet 13 to be inserted are arranged at an entrance opening 222a of the sheet supply path 222. Further, a sheet supply sensor 227 for detecting the supply of the sheet 13 is arranged between the pick-up roller (sheet supply means) 225 and the shutter member 226.

Next, the load applied to the laminate films 206a, 206b in the pulling direction (direction shown by the arrow 216) will be explained with reference to FIG. 18.

Figure 18A:
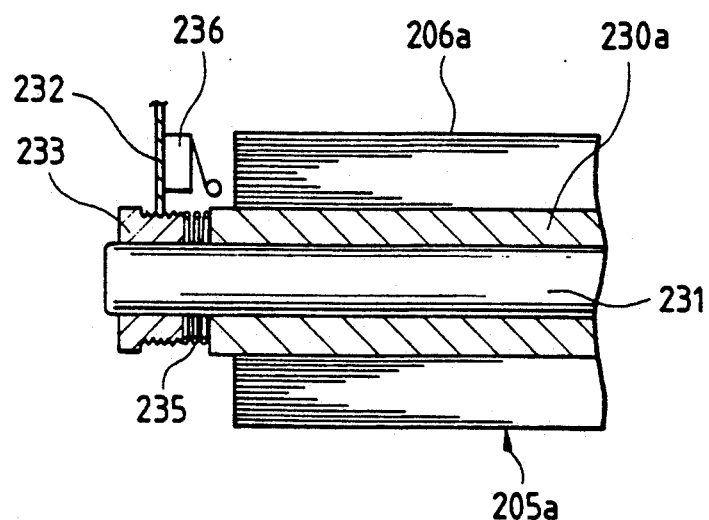
FIGS. 18A and 18B are partial sectional views of a sheet roll used in the laminating apparatus of FIG. 17.

In FIG. 18A, the laminate film 206a is wound around a core metal 230a to form the laminate film roll 205a. A roll shaft 231 around which the core metal 230a is rotatably mounted is supported by a side plate 232 of the laminating apparatus C via a tension adjusting nut 233 which is threaded into the side plate. A tension spring 235 is disposed between the tension adjusting nut 233 and the core metal 230a, so that the load on the laminate film roll 295a in the pulling direction can be adjusted on the basis of the tightness of the tension adjusting nut 233.

Figure 18B:
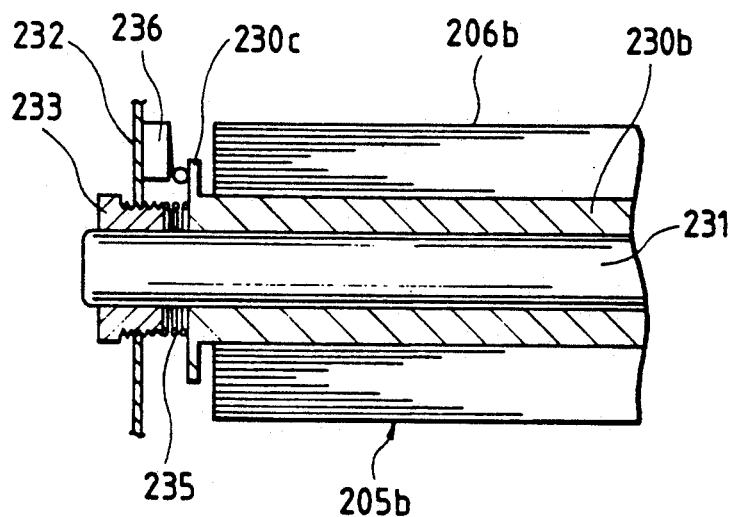

Now, the laminate film roll 205a is constituted by the laminate film having a first thickness. The laminate film roll 205b shown in FIG. 18B is constituted by the laminate film 206b having a second thickness and is mounted on a core metal 230b. And, the core metal 230a has no flange, whereas the core metal 230b is provided at its one end with a flange 230c. In the vicinity of the core metals, core metal discriminating switches 236 are mounted on the side plate 232. When the core metal discriminating switch 236 is turned OFF, the first core metal 230a is discriminated, whereas, when the core metal discriminating switch 236 is turned ON, the second core metal 230b is discriminated Incidentally, in the illustrated embodiment, while the two core metals 230a, 230b were discriminated from each other, three or more core metals, and accordingly, three or more laminate films having different thicknesses may be discriminated from each other, by changing outer diameters of the flanges and by providing three or more core metal discriminating switches 236.

Next, the drive system of the laminating apparatus C will be fully described with reference to FIG. 19.

Figure 19:
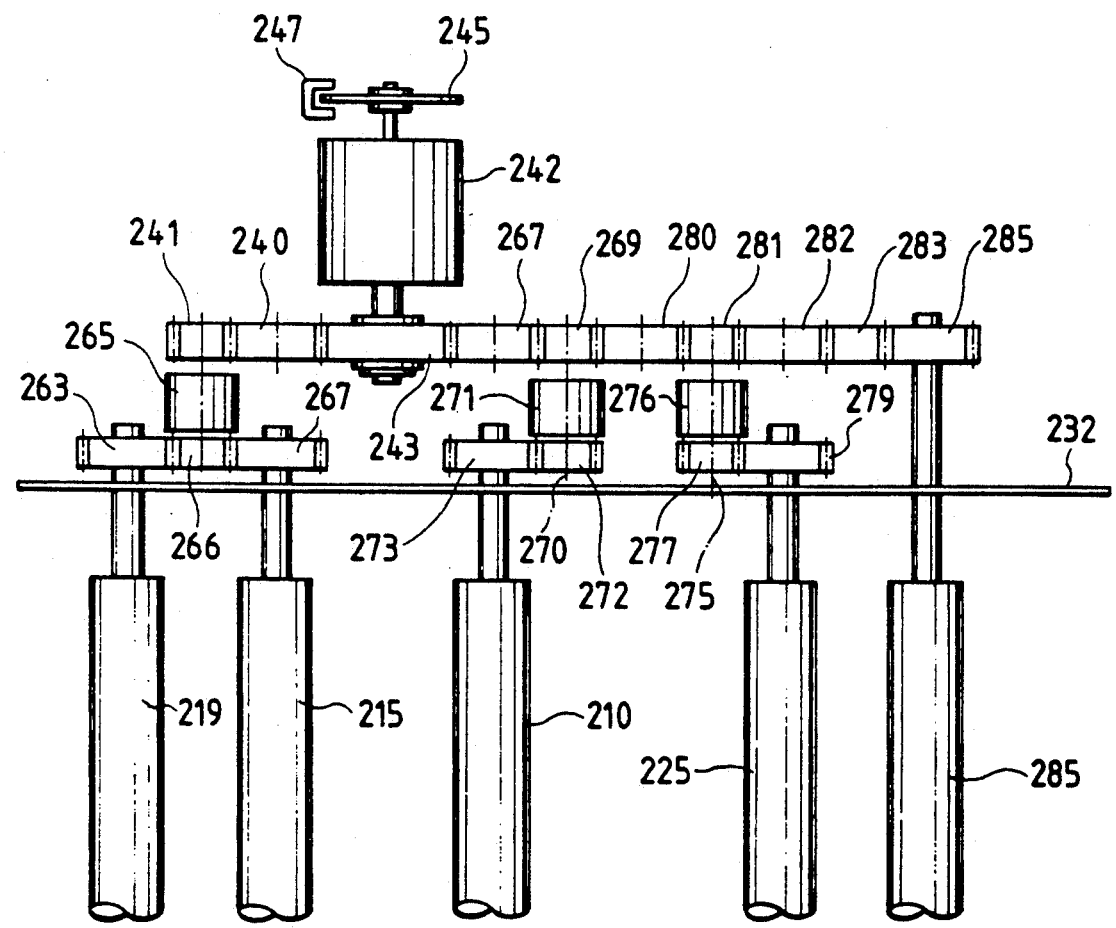
FIG. 19 is a development view showing a drive system of the laminating apparatus of FIG. 17.

In FIG. 19, a main motor 242 is secured to the side plate 232 via an attachment member (not shown) and has an output shaft on which a motor gear 243 and a clock disc 245 are fixedly mounted. The rotation of the motor gear 243 is transmitted to an idle gear 240 and an idle gear 241 rotatably mounted on a support shaft 246. A gear 266 integral with the support shaft 246 and a pull roller clutch 265 are mounted on the support shaft 246, and a pull roller gear 267 fixed to a shaft of the pull roller 215 is meshed with the gear 266. Further, the gear 266 is also meshed with an ejector roller gear 263 integral with the ejector roller 219. The rotation of the main motor 242 is transmitted to the paired pull rollers 215 and the paired ejector rollers 219 under the ON/OFF control of the pull roller clutch 265.

Further, the rotation of the motor gear 243 is transmitted to an idle gear 267' and an idle gear 269 rotatably mounted on a support shaft 270. A pressure roller clutch 271 and a gear 272 integral with the support shaft 270 are mounted on the support shaft 270. The gear 272 is meshed with a pressure roller gear 273 fixed to a shaft of the pressure/heat roller 210. The rotation of the main motor 242 is transmitted to the paired pressure/heat rollers 210 under the ON/OFF control of the pressure roller clutch 271.

The idle gear 269 is connected to a gear train comprising idle gears 280~283. On a support shaft 275 on which the idle gear 281 is rotatably mounted, a gear 277 integral with the support shaft 275 and a pick-up roller clutch 276 are also mounted. The gear 277 is meshed with a pick-up roller gear 279 integral with the pick-up roller 225. By the ON/OFF control of the pick-up roller clutch 276, the rotation of the main motor 242 is transmitted to the pick-up roller 225. The idle gear 283 is meshed with an ejector roller gear 285 integral with the ejector roller 286, so that it is always rotated by the rotation of the main motor 242. The ejector roller 286 serves to eject the sheet 13 sent from the image forming system (not shown) out of the laminating apparatus without the laminate treatment.

The clock disc 245 has a plurality of slits (not shown), and a clock sensor 247 comprising an optical sensor of a permeable type for detecting the slit is disposed near the clock disc 245.

Next, the laminate treatment of the sheet 13 will be explained.

The leading end of the sheet 13 rested on the sheet supply support 221 (FIG. 17) is inserted into the inlet opening 222a and is abutted against the shutter member 226. When the sheet 13 is detected by the sheet supply sensor 227, a shutter solenoid 249 (FIG. 20) is activated to retract the shutter member 226 from the sheet supply support 221. At the same time, a pick-up solenoid 250 is also activated to lower the pick-up roller 225 to press the sheet 13 with a given pressure.

Thereafter, a pick-up motor 225a is turned ON to rotate the pick-up roller 225. The sheet 13 is fed by the rotation of the pick-up roller 225. When a predetermined time is elapsed, the main motor 242 is turned ON to rotate the paired pull rollers 215. The laminate films 206a, 206b are pulled by the paired pull rollers 215, and the paired pressure/heat rollers 210 and the pre-heat rollers 209a, 209b are driven. The non-adhered laminate films 206a, 206b are heated up to the first temperature by means of the pre-heat rollers 209a, 209b which have been previously heated, and then are heated up to the second temperature controlled to have the constant value by the paired pull rollers 215.

The sheet 13 is fed to the nip between the paired pressure/heat rollers 210 by means of the pick-up roller 225, where the sheet is sandwiched by the upper and lower laminate films 206a, 206b and is pressurized and heated by the paired pressure/heat rollers 210, thus performing the laminate treatment. After the pick-up roller 225 is rotated for a predetermined time period, the pick-up solenoid 250 is activated to retract the pick-up roller from the sheet supply support 221, and is stopped when the pick-up motor 225a is turned OFF.

When the trailing end of the sheet 13 is detected by the sheet supply sensor 227, the clock sensor 247 starts to count the number of slits of the clock disc 245. After a distance between the sheet supply sensor 227 and the cutter unit 217 is measured, the main motor 242 is turned OFF, thus stopping the feeding of the laminate-treated sheet 13. At the same time, the cutter motor 252 is turned ON, whereby the trailing ends of the laminate films 206a, 206b sandwiching the sheet 13 therebetween are cut by the cutter 217a. The cut laminate sheet is ejected out of the apparatus onto an ejector tray (not shown) by means of the ejector rollers 219.

By repeating the above-mentioned laminate treatment operations, the sheets 13 are successively laminate-treated.

Next, the control and operation of the laminating apparatus C will be explained with reference to a block diagram shown in FIG. 20.

Figure 20:
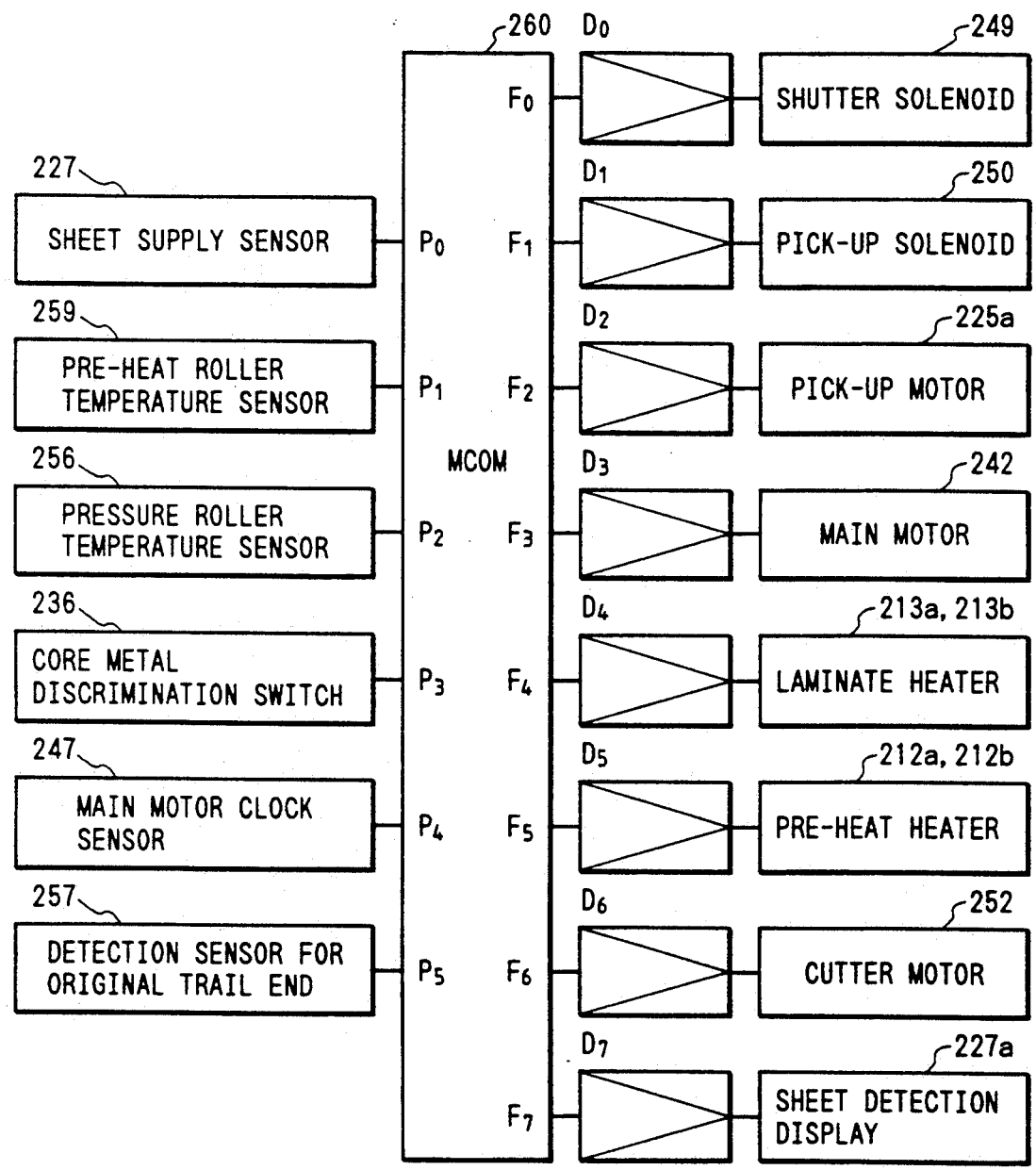
FIG. 20 is a block diagram of a control circuit of the laminating apparatus of FIG. 17.

In FIG. 20, the control operation is mainly effected by a well-known one-chip microcomputer (referred to as "MCOM" hereinafter) 260 incorporating a ROM, RAM and the like. In input ports $P_0 \sim P_4$ of the MCOM 260, various input signals from the sheet supply sensor 227 for detecting the presence of the pick-up roller 225 on the sheet supply support 221, pre-heat roller temperature sensors 259 comprising the thermistors for measuring the surface temperatures of the pre-heat rollers 209a, 209b, pressure/heat roller temperature sensors 256 for measuring the surface temperatures of the pull rollers 215, core metal discriminating switches 236 for discriminating the core metals 230a, 230b for the laminate films 206a, 206b to discriminate the thickness of the laminate films, and clock sensor 247 for counting the rotation amount of the main motor 242 and the peripheral shifting amounts of the pull rollers 215 are inputted respectively.

Further, from output ports $F_0 \sim F_7$ of the MCOM 4, output signals regarding the ON/OFF operation of the shutter member 226, ON/OFF operation of the pick-up solenoid 250 for shifting the pick-up roller 225 onto the sheet 13 and for urging the sheet at a given pressure, ON/OFF operation of the pick-up motor 251 for rotating the pick-up roller 225, ON/OFF operation of the laminate heaters 213a, 213b for heating the laminate films 206a, 206b, ON/OFF operation of the pre-heaters 212a, 212b for maintaining the surface temperatures of the pressure/heat rollers 210 at the constant value, ON/OFF operation of the cutter motor 252 for cutting the laminate-treated laminate sheet from the continuous laminate films 206a, 206b, and sheet detection display 227a for teaching the operator the receipt of the sheet 13 and the permission of the laminate treatment are outputted respectively.

Further, the NCOM 260 sends output signals to the pull roller clutch 265 (FIG. 19), pressure roller clutch 271, sheet supply motor 275 and pick-up roller clutch 276 and the like. The reading of the input signals or ON/OFF of the loads, and the controls to the various set values are carried out on the basis of the program stored in the ROM of the MCOM 260.

Next, the control of the surface temperatures of the pre-heat rollers 209a, 209b and the pressure/heat rollers (laminate rollers) 210a, 210b will be explained with reference to a flow chart shown in FIG. 21.

Figure 21:
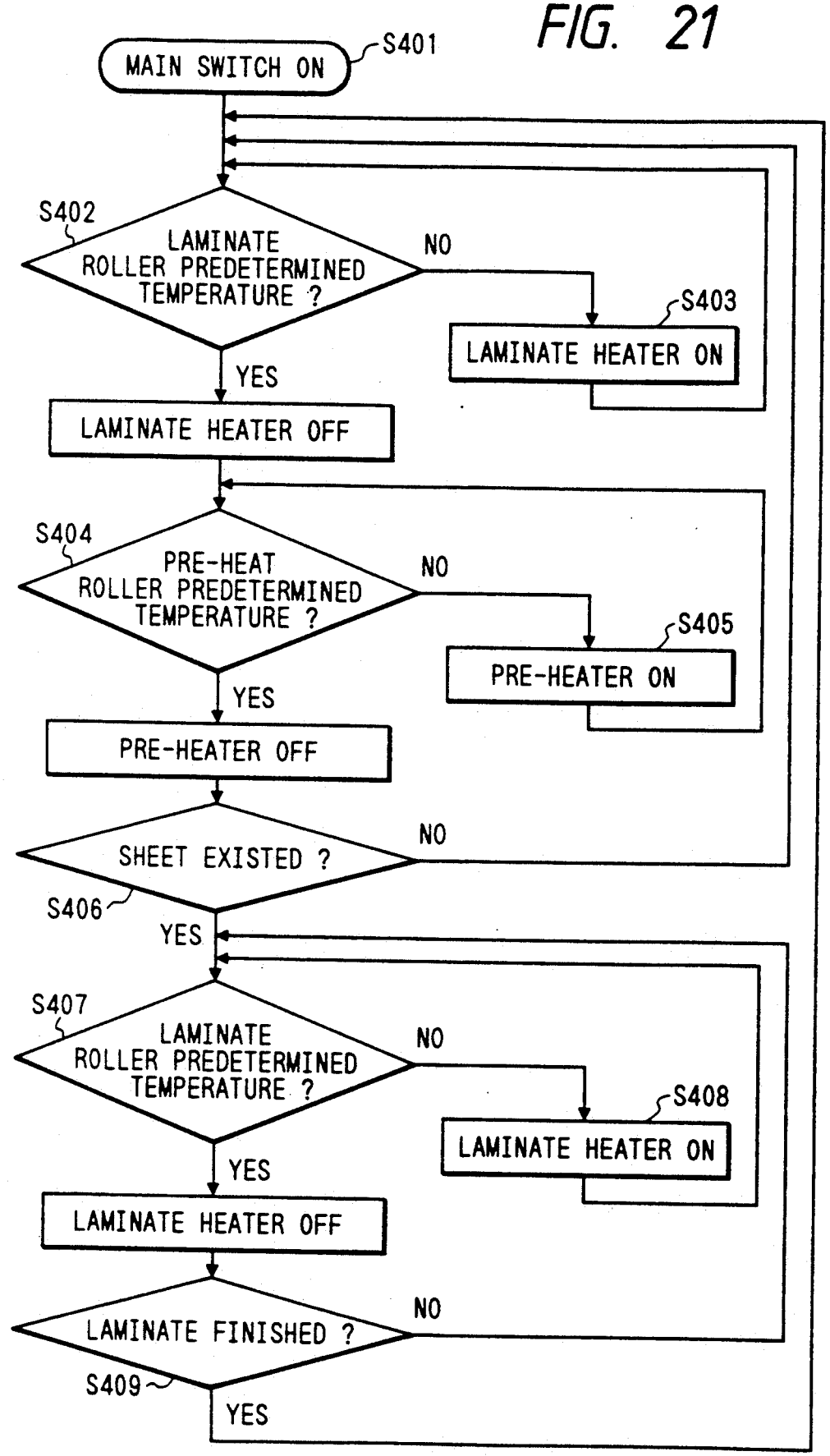
FIG. 21 is a flow chart showing an example of control of the laminating apparatus of FIG. 17.

In FIG. 21, when a main switch SW is turned ON (step S401), the surface temperatures of the pressure/heat rollers (laminate rollers) 210 are detected by the pressure/heat roller temperature sensor 256, and the detected temperatures are compared with preselected aimed temperatures (step S402). If the detected temperatures are lower than the aimed temperatures, the laminate heaters 213a, 213b are turned ON (step S403) to heat the laminate rollers up to the predetermined temperature, and then the heaters are turned OFF.

Then, the surface temperatures of the pre-heat rollers 209a, 209b are detected by the pre-heat roller temperatures sensor 259 and the detected temperature are compared with preselected aimed temperatures (step S404). The preselected temperature is set on the basis of the information from the core metal discriminating switches 236 in accordance with the thickness of the films. If the detected temperatures do not reach the preselected temperatures, the pre-heaters 212a, 212b are turned ON (step S405) to heat the pre-heat rollers up to the predetermined temperature, and then, the pre-heaters 212a, 212b are turned OFF. In this way, the adjustment of the temperatures of the pre-heat rollers 209a, 209b and the pull rollers 215 is finished.

Then, it is judged whether the sheet 13 exists in the sheet supply path 222 of the sheet supply support 221, on the basis of the information from the sheet supply sensor 227. If negative, the adjustment of the temperatures is effected again. On the other hand, if the sheet 13 exists, only the temperature control of the pull rollers (laminate rollers) 215 is carried out (steps S407, S408).

It is judged whether the laminate treatment is finished or not, on the basis of the information from the sheet supply sensor 227 regarding the trailing end of the sheet 13 (step S409). If the sheet exists, the temperature control of the pressure/heat rollers (laminate rollers) 210 is carried out (steps S407, S408); whereas, if the sheet does not exist, the temperature adjustments of the pressure/heat rollers 210 and the pre-heat rollers 209a, 209b are carried out again (step S402, S404).

Figure 22:
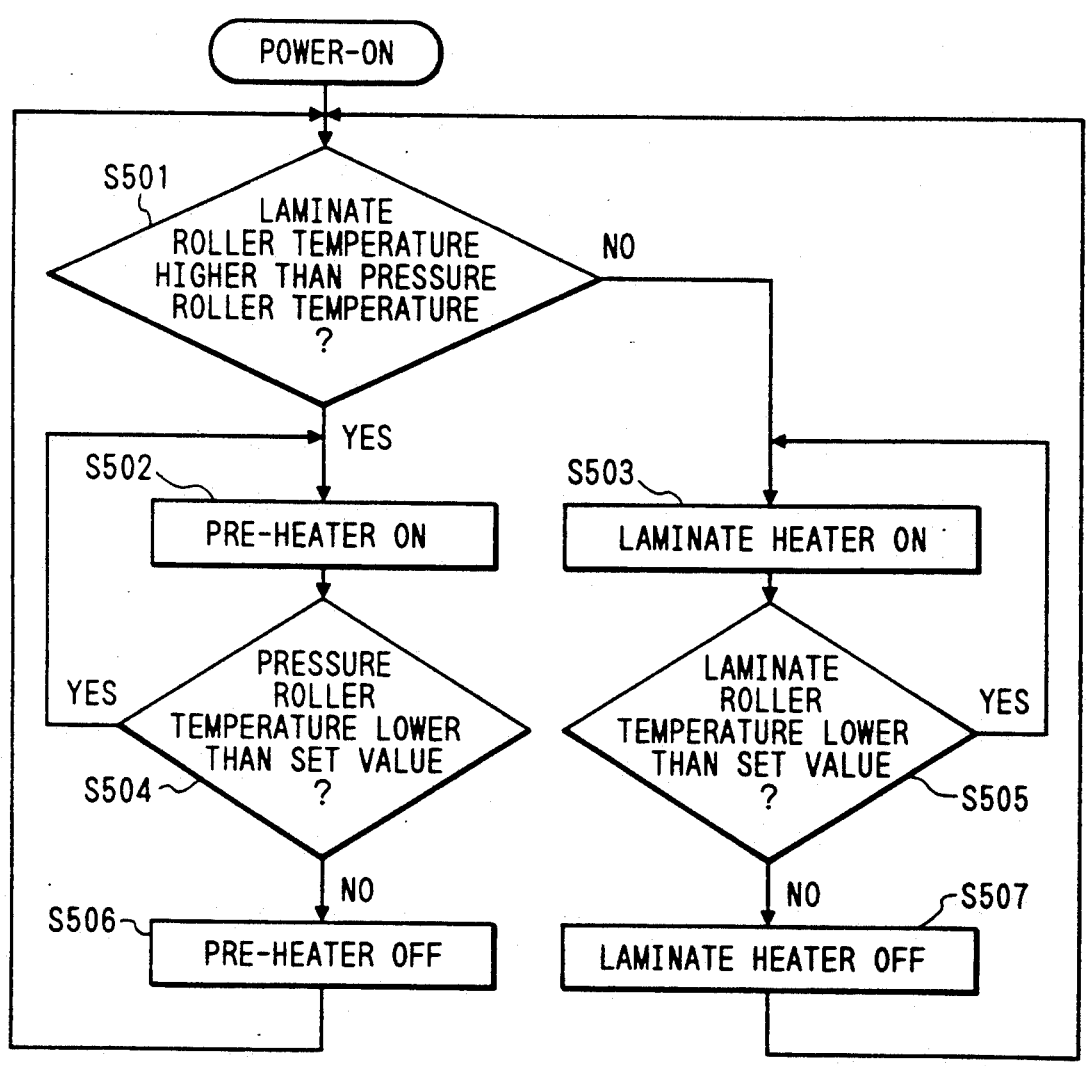
FIG. 22 is a flow chart showing another example of control of the laminating apparatus of FIG. 17.

FIG. 22 shows a flow chart regarding the operation according to a further embodiment of the present invention.

In FIG. 22, after the power source is turned ON, the temperatures of the pre-heat rollers 209a, 209b are compared with the temperatures of the pressure/heat rollers 210a, 210b, on the basis of the detected results of the pre-heat roller temperature sensor 259 and the pressure/heat roller temperature sensor 256, and the heaters regarding the combination of two rollers having the lower temperature (or the combination of two rollers having the lowest temperature and lowest but one temperature) are turned ON first (That is to say, preference of the heaters is determined (step S501).

If the temperature of the pre-heat rollers 209a, 209b are lower than those of the pressure/heat rollers, the heaters regarding the pre-heat rollers are turned ON to heat the later up to the preselected value, and then, the heaters are turned OFF (steps S502, S504, S506). At the same time, the other laminate heaters 213a, 213b are turned ON to heat the rollers to heat the rollers up to the predetermined value for a predetermined time period, and then, these heaters are turned OFF (steps S503, S505, S507).

Figure 23:
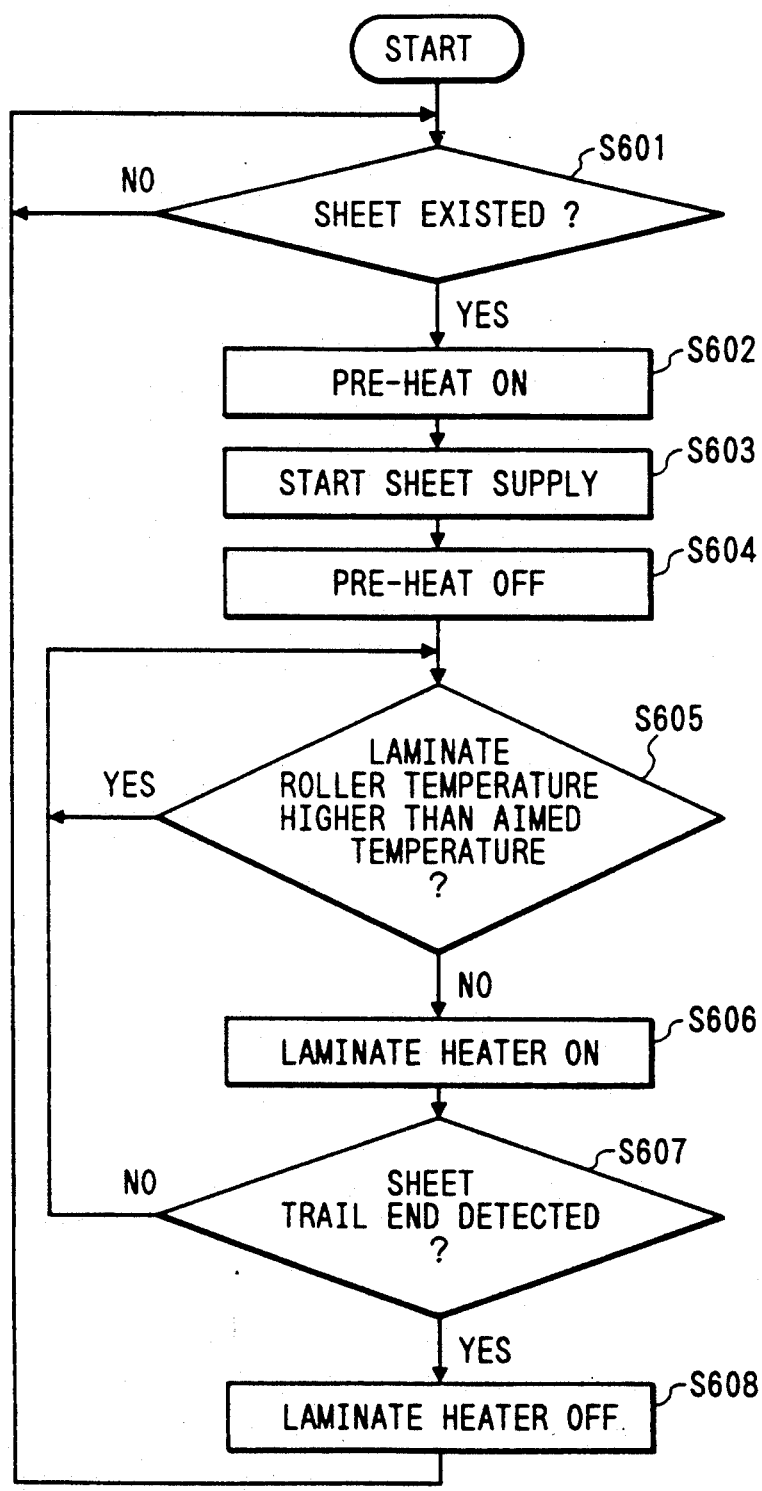
FIG. 23 is a flow chart showing a further example of a control of the laminating apparatus of FIG. 17.
Figure 24:
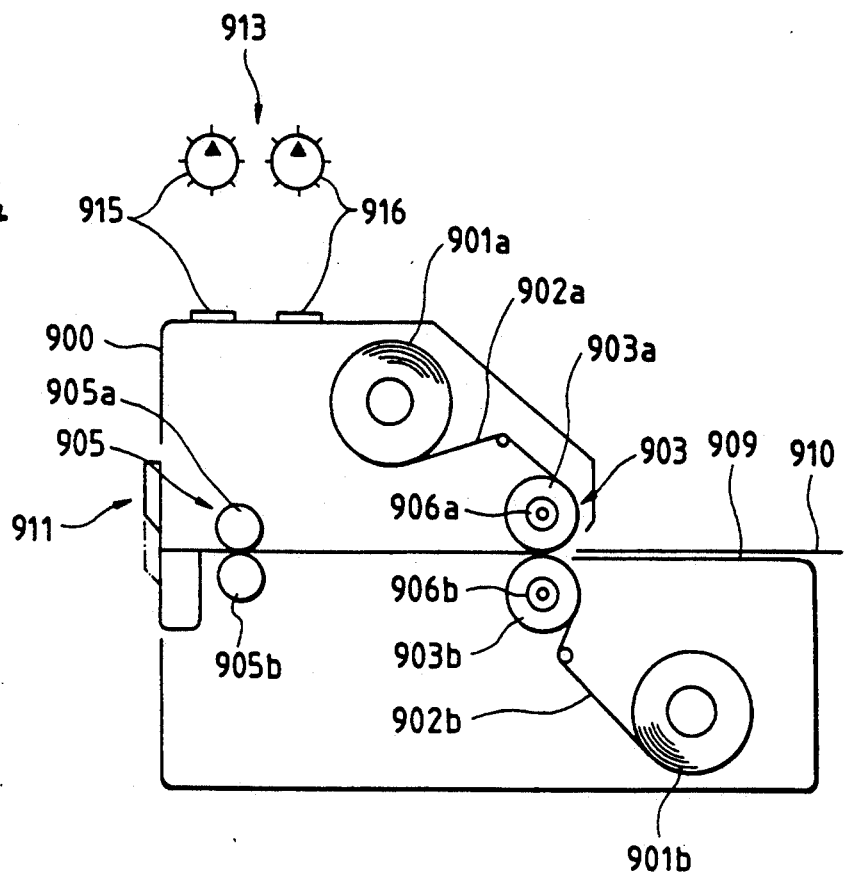
FIG. 24 is an elevational sectional view showing an example of a conventional laminating apparatus.

FIG. 23 shows a flow chart regarding the operation in a still further embodiment of the present invention.

When the sheet 13 is detected by the sheet supply sensor 227 (step S601), the pre-heaters 212a, 212b are turned ON in order to previously heat the laminate films 206a, 206b by the heat means (pre-heaters 212a, 212b) (In this case, the laminate heaters 213a, 213b must be turned OFF). And, at the same time as the sheet 13 is supplied, the pre-heaters 212a, 212b are turned OFF (step S604) (That is to say, the pre-heaters 212a, 212b are preferentially turned ON and then turned OFF).

Then, the temperatures of the pressure/heat rollers 210a, 210b are detected by the pressure/heat roller temperature sensor 256, and the detected temperatures are compared with aimed temperatures (step S605). If the detected temperatures are lower than the aimed temperature, the laminate heaters 213a, 213b regarding the pressure/heat rollers 210a, 210b are turned ON (step S606). The activating time of the laminate heaters 213a, 213b is so selected that these heaters are turned OFF (step S608) after the trailing end of the sheet 13 is detected by the sheet detection sensor 257 (FIG. 20) (step S607).

As shown in the flow charts of FIGS. 21 and 22, when the laminate heaters 213a, 213b and the pre-heaters 212a, 212b are not simultaneously activated, but either one of them are activated, it is possible to set the available electric power (heating ability) of each heater to be higher than the case where the laminate heaters 213a, 213b and the pre-heaters 212a, 212b are independently controlled. That is to say, when the heaters are controlled independently, since there is the case where both heaters are simultaneously heated, the total electric power of the heaters must be limited within the acceptable range. To the contrary, when the heaters are controlled not to be activated simultaneously, the electric power of each heater may be limited within the acceptable range. Accordingly, the heating ability of each heater can be increased, thus shortening the heating time.

Further, in the illustrated embodiment, the laminate heaters 213a, 213b consume much quantity of heat to be cooled faster because they heat the sheet and the pair of laminate films; whereas, the pre-heaters 212a, 212b are not cooled quickly because they heat only one of the laminate films. Thus, as shown in the flow chart of FIG. 21, during the laminate treatment operation, the efficiency of the laminate treatment is not worsened even when only the temperature control of the laminate heaters 213a, 213b is carried out. And, when the available electric power of the pre-heaters 212a, 212b are set to have a low value, the power consumption can be reduced accordingly.

Further, in the flow chart shown in FIG. 22, since the temperatures of the laminate heaters 213a, 213b are quickly decreased, in practice, the temperature control of the laminate heaters 213a, 213b are effected almost all. Also, in this case, similar to the above, when the available electric power of the pre-heaters 212a, 212b are set to have a low value, the power consumption can be reduced accordingly.

Now, as a recording means of the image forming system to which the laminating apparatus of the present invention is connected, an ink jet recording means is preferably used.

The ink jet recording means comprises liquid discharge openings for discharging ink liquid as flying droplets, liquid passages communicated with the discharge openings, and discharge energy generating means disposed in the liquid passages and adapted to generate the discharge energy for flying the liquid droplets in the liquid passages. By selectively energizing the discharge energy generating means in response to an image signal, the liquid droplets are discharged to form an image on a recording medium.

As the discharge energy generating means, for example, pressure energy generating means such as electrical/mechanical converters such as piezo-electric elements, electromagnetic energy generating means for discharging the ink by heating the ink by means of the electromagnetic wave and by applying pressure to the ink due to the heating action, or thermal energy generating means for discharging the ink by heating the ink liquid by means of electrical/thermal converters can be used. Among them, the thermal energy generating means using the electrical/thermal converters is most preferable since the discharge openings can be arranged with high density to perform the recording with high resolving power and the recording head can be compacted.

In the illustrated embodiment, an ink jet recording means of a serial-type which is one kind of ink jet recording means is used as the recording means.

Figure 25:
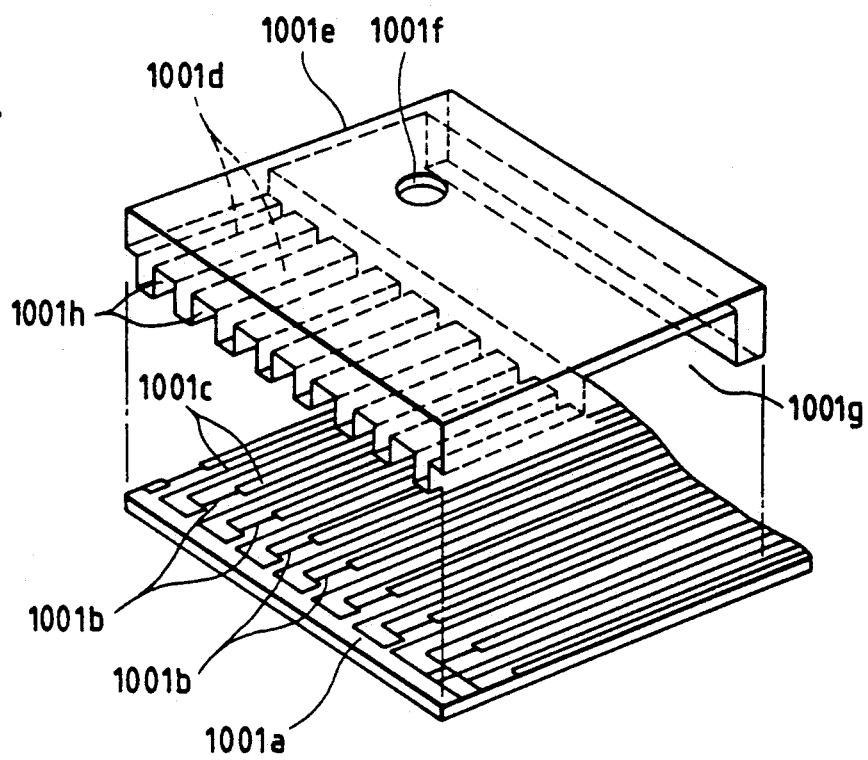
FIG. 25 is an exploded perspective view of a recording head of an ink jet image forming system.
Figure 26A:
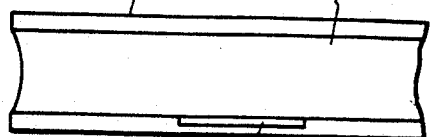
FIGS. 26A to 26G are explanatory views for explaining an ink jet recording principle.
Figure 26B:
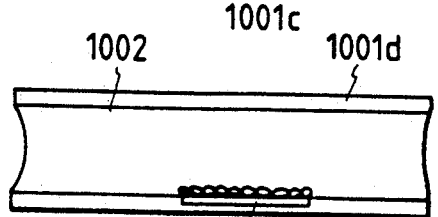
Figure 26C:
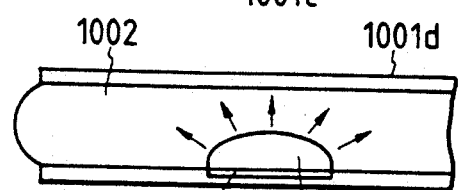
Figure 26D:
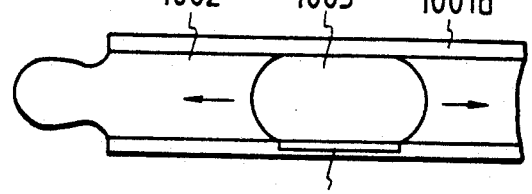
Figure 26E:
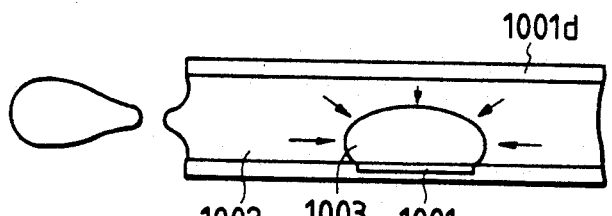
Figure 26F:
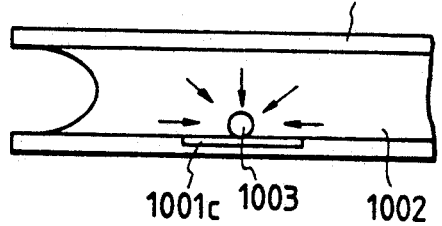
Figure 26G:
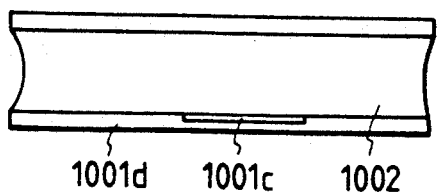

FIG. 25 shows an exploded perspective view of the recording head constituting the recording means, and FIGS. 26A and 26G show a principle of the bubble jet recording process. Incidentally, the typical construction and principle thereof are disclosed, for example, in U.S. Pat. Nos. 4,723,239 and 4,740,796.

In FIG. 25, the reference numeral 1001a denotes a heater board wherein electrical/thermal converters (discharge heaters) 1001b and electrodes 1001c made of aluminium which supply electric powers to the electrical/thermal converters are formed on a silicon substrate by a film forming process. A top plate 1001e having partition walls for defining recording liquid passage (nozzles) 1001d is adhered to the heater board 1001a. Further, an ink cartridge (not shown) for supplying the ink to the recording head is removably mounted on the head in place.

The ink supplied from the ink cartridge to the recording head via a liquid supply tube is directed to a common liquid chamber 1001g in the head through a supply opening 1001f formed on the top plate 1001e and then is sent to the nozzles 1001d from the common liquid chamber 1001g. The nozzle 1001d have ink discharge openings 1001h, respectively, which are disposed at a predetermined pitch along a sheet feeding direction in confronting relation to the sheet.

In the illustrated embodiment, the recording head is mounted on a reciprocable carriage and the recording is performed by discharging the ink from the recording head in synchronism with the shifting movement of the carriage.

Now, a principle for forming the flying droplet in the jet recording process will be explained with reference to FIGS. 26A to 26G.

In the steady-state, as shown in FIG. 26A, a tension force of the ink 1002 filled in the nozzle 1001d is equilibrated with the external force at a discharge opening surface. In this condition, when the ink is desired to fly, the electrical/thermal converter 1001b disposed in the nozzle 1001d is energized to abruptly increase the temperature of the ink in the nozzle 1001d exceeding the nucleate boiling. Consequently, as shown in FIG. 26B, the ink portion adjacent to the electrical/thermal converter 1001b is heated to create a fine bubble, and then the heated ink portion is vaporized to generate the film boiling, thus growing the bubble 1003 quickly, as shown in FIG. 26C.

When the bubble 1003 grows to the maximum extent as shown in FIG. 26D, the ink droplet is pushed out of the discharge opening of the nozzle 1001d. When the electrical/thermal converter 1001b is de-energized, as shown in FIG. 26E, the grown bubble 1003 is cooled by the ink 1002 in the nozzle 1001d to contract. Thus, the growth and contraction of the bubble, the ink droplet is flying from the discharge opening. Further, as shown in FIG. 26F, the ink contacted with the surface of the electrical/thermal converter 1001b is quickly cooled, thus diminishing the bubble 1003 or reducing the volume of the bubble to a negligible extent. When the bubble 1003 is diminished, as shown in FIG. 26G, the ink is replenished in the nozzle 1001d from the common liquid chamber 1001g by a capillary phenomenon, thus preparing the next formation of the ink droplet.

Accordingly, by reciprocally shifting the carriage and by selectively energizing the electrical/thermal converters 1001b in response to the image signal, the ink image can be recorded on the sheet. Incidentally, in the ink jet recording system, it is preferable to arrange an ink recovery means at an end of a shifting range of the carriage.

Such ink recovery means serves to prevent the drying of the ink and thus the solidification of the ink around the discharge openings of the recording head by covering or capping the recording head in an inoperative condition. Incidentally, it is preferable to perform the ink recovering treatment, by sucking the ink from the discharge openings by a sucking force created by driving a pump connected to the ink recovery means, in order to prevent poor discharge of ink or to remove the ink from the discharge openings.

We claim:

1. A laminating apparatus to be connected to an image forming apparatus, comprising:
   sheet support means for supporting a sheet on which an image is formed by the image forming apparatus and discharged from the image forming apparatus;
   sheet feeding means for feeding the sheet on which the image is formed by the image forming apparatus;
   laminate film feeding means for feeding laminate films;
   heating means for heating the laminate films fed from said film feeding means;
   pressure means for pressurizing the sheet and the laminate films that are fed by said sheet feeding means and laminate film feeding means, respectively, in an overlapping manner;
   temperature detection means for detecting a temperature of said heating means; and
   control means for prohibiting a laminate operation when the temperature detected by said temperature detection means is lower than a set temperature in a laminate mode, and for discharging the sheet from the image forming apparatus to said sheet support means in a non-laminate mode.

2. A laminating apparatus according to claim 1, wherein said control means prohibits the operation of said sheet feeding means when the temperature detected by said temperature detection means is lower than the set temperature.

3. A laminating apparatus according to claim 1, wherein said control means prohibits the operation of said laminate film feeding means when the temperature detected by said temperature detection means is lower than the set temperature.

4. A laminating apparatus according to claim 1, wherein said control means prohibits the operation of said pressure means when the temperature detected by said temperature detection means is lower than set temperature.

5. A laminating apparatus according to claim 1, further including heat quantity detection means for detecting the quantity of heat absorbed by the sheet, and wherein said control means changes the set temperature in accordance with the quantity of heat absorbed by the sheet detected by said heat quantity detection means.

6. A laminating apparatus according to claim 5, wherein said control means changes the set temperature to be higher as the quantity of heat absorbed by the sheet is increased.

7. A laminating apparatus according to claim 5, wherein said heat quantity detection means comprises a sheet thickness detection means for detecting a thickness of the sheet fed by said sheet feeding means.

8. A laminating apparatus according to claim 5, wherein said heat quantity detection means comprises density detection means for detecting image density of the sheet fed by said sheet feeding means.

9. A laminating apparatus according to claim 1, further including a laminate film heat quantity detection means for detecting the quantity of heat absorbed by the laminate film and wherein said control means changes the set temperature in accordance with the quantity of heat absorbed by the laminate film detected by said laminate film heat quantity detection means.

10. A laminating apparatus according to claim 9, wherein said control means changes the set temperature to be higher as the quantity absorbed by heat of the laminate film is increased.

11. A laminating apparatus according to claim 9, wherein said laminate film heat quantity detection means comprises a film thickness detection means for detecting a thickness of the laminate film fed by said laminate film feeding means.

12. A laminating apparatus according to claim 1, further including pre-heat means disposed in the laminate film feeding means for heating the laminate film being fed.

13. A laminating apparatus according to claim 12, further including heat quantity detection means for detecting the quantity of h eat absorbed by the sheet, and wherein said control means changes a heat temperature by means of said pre-heat means in accordance with the quantity of heat absorbed by the sheet detected by said heat quantity detection means.

14. A laminating apparatus according to claim 13, wherein said control means changes said heat temperature to be higher as the quantity of heat absorbed by the sheet is increased.

15. A laminating apparatus according to claim 13, wherein said sheet heat quantity detection means comprises a sheet thickness detection means for detecting a thickness of the sheet fed by said sheet feeding means.

16. A laminating apparatus according to claim 13, wherein said sheet heat quantity detection means comprises a density detection means for detecting image density of the sheet fed by said sheet feeding means.

17. A laminating apparatus according to claim 12, further including laminate film heat quantity detection means for detecting the quantity of heat absorbed by the laminate film and wherein said control means changes a heat temperature by means of said pre-heat means in accordance with the quantity of heat absorbed by the laminate film detected by said laminate film heat quantity detection means.

18. A laminating apparatus according to claim 17, wherein said control means changes said heat temperature to be higher as the quantity of heat absorbed by the laminate film is increased.

19. A laminating apparatus according to claim 17, wherein said laminate film heat quantity detection means comprises film thickness detection means for detecting a thickness of the laminate film fed by said laminate film feeding means.

20. A laminating apparatus according to claim 1, wherein said pressure means comprises a pair of rollers, and said heating means is disposed in said rollers, whereby the sheet and the laminate films are simultaneously heated and pressurized by means of said heat means and said rollers.

21. An image forming system comprising:
an image forming means for forming an image on a sheet;
sheet support means for supporting a sheet on which an image is formed by said image forming apparatus and discharged from said image forming apparatus;
sheet feeding means for feeding the sheet on which the image is formed by the image forming apparatus;
laminate film feeding means for feeding laminate films;
heating means for heating the laminate films fed from said film feeding means;
pressure means for pressurizing the sheet and the laminate films that are fed by said sheet feeding means and laminate film feeding means, respectively, in an overlapping manner;
temperature detection means for detecting a temperature of said heating means; and
control means for prohibiting a laminate operation when the temperature detected by said temperature detection means is lower than a predetermined set temperature in a laminate mode, and for discharging the sheet from said image forming apparatus to said sheet support means in a non-laminate mode.

22. An image forming system according to claim 21, wherein said control means releases prohibition of the laminating operation when the detected temperature is higher than the set temperature.

23. An image forming system according to claim 21, wherein said control means permits the operation of said image forming means when the temperature detected by said temperature detection means is lower than the predetermined set temperature and the sheet on which the image is formed by said image forming means is ejected out of the image forming system.

24. An image forming system according to claim 21, wherein said control means permits the operation of said image forming means when the temperature detected by said temperature detection means is lower than the predetermined set temperature, and the sheet on which the image is formed by said image forming means is temporarily maintained within said image forming means.

25. An image forming system according to claim 21, wherein said control means permits the operation of said image forming means when the temperature detected by said temperature detection means is lower than the predetermined set temperature, and the sheet on which the image is formed is temporarily maintained within said sheet feeding means.

26. An image forming system according to claim 21, further including sheet heat quantity detection means for detecting the quantity of heat absorbed by the sheet, and wherein said control means changes the set temperature in accordance with the quantity of heat absorbed by the sheet detected by said sheet heat quantity detection means.

27. An image forming system according to claim 26, wherein said control means changes the set temperature to be higher as the quantity of heat absorbed by the sheet is increased.

28. An image forming system according to claim 26, wherein said sheet heat quantity detection means comprises sheet thickness detection means for detecting a thickness of the sheet fed by said sheet feeding means.

29. An image forming system according to claim 26, wherein said sheet heat quantity detection means comprises a density detection means for detecting image density of the sheet fed by said sheet feeding means.

30. An image forming system according to claim 21, further including a laminate film heat quantity detection means for detecting the quantity of heat absorbed by the laminate film and wherein said control means changes the set temperature in accordance with the quantity of heat absorbed by the laminate film detected by said laminate film heat quantity detection means.

31. An image forming system according to claim 30, wherein said control means changes the set temperature to be higher as the quantity of heat absorbed by the laminate film is increased.

32. An image forming system according to claim 30, wherein said laminate film heat quantity detection means comprises a film thickness detection means for detecting a thickness of the laminate film fed by said laminate film feeding means.

33. An image forming system according to claim 21, wherein said image forming system utilizes an ink jet recording means for forming an image by discharging ink.

34. An image forming system according to claim 21, wherein said image forming system utilizes an ink jet recording means for forming an image by energizing electrical/thermal converters and by discharging ink from a discharge opening due to the growth of a bubble created by heating the ink to a temperature exceeding a film boiling point.

35. A laminating apparatus, comprising:
sheet feeding means for feeding a sheet on which an image is formed;
sheet feeding means for feeding a sheet on which an image is formed;
laminate film feeding means for feeding laminate films;
heating means for heating the laminate films being fed;
pressure means for pressurizing the sheet and the laminate films that are fed by said sheet feeding means and laminate film feeding means, respectively, in an overlapping manner;
sheet detection means for detecting the sheet fed by said sheet feeding means; and
control means for heating said heating means to a first temperature when the sheet is not detected by said sheet detection means, and for heating said heating means to a second temperature when the sheet is detected by said sheet detection means.

36. A laminating apparatus according to claim 35, wherein said second temperature is a temperature required for laminate-treating the sheet, and said first temperature is a pre-heat temperature set to be lower than said second temperature.

37. A laminating apparatus according to claim 36, wherein said control means stops the operation of said heating means when the pre-heat temperature condition continues for a predetermined time period.

38. A laminating apparatus according to claim 35, wherein said pressure means comprises a pair of rollers, and said heating means is disposed in said rollers, whereby the sheet and the laminate films are simultaneously heated and pressurized by means of said heating means and said rollers.

39. A laminating apparatus according to claim 35, further including pre-heat means disposed in said laminate film feeding means for heating the laminate film being fed to a predetermined pre-heat temperature.

40. A laminating apparatus according to claim 39, wherein said control means controls said pre-heat means in such a manner that said pre-heat means heats the laminate films to the pre-heat temperature when the sheet is detected by said sheet detection means, and said pre-heat means heats the laminate films to a set temperature lower than the pre-heat temperature when the sheet is not detected by said sheet detection means.

41. An image forming system, comprising:
image forming means for forming an image on a sheet;
sheet feeding means for feeding a sheet on which an image is formed;
laminate film feeding means for feeding laminate films;
heating means for heating the laminate films being fed;
pressure means for pressurizing the sheet and the laminate films that are fed by said sheet feeding means and laminate film feeding means, respectively, in an overlapping manner;
sheet detection means for detecting the sheet fed by said sheet feeding means; and
control means for heating said heating means to a first temperature when the sheet is not detected by said sheet detection means, and for heating said heating means to a second temperature when the sheet is detected by said sheet detection means.

42. An image forming system according to claim 41, wherein said second temperature is a temperature required for laminate-treating the sheet, and said first temperature is a pre-heat temperature set to be lower than said second temperature.

43. An image forming system according to claim 41, further including pre-heat means disposed in said laminate film feeding means for heating the laminate films being fed to a predetermined pre-heat temperature.

44. An image forming system according to claim 43, wherein said control means controls said pre-heat means in such a manner that said pre-heat means heats the laminate film to the pre-heat temperature when the sheet is detected by said sheet detection means, and said pre-heat means heats the laminate films to a set temperature lower than said pre-heat temperature when the sheet is not detected by said sheet detection means.

45. An image forming system according to claim 41, wherein said image forming system utilizes an ink jet recording means for forming an image by discharging ink.

46. An image forming system according to claim 41, wherein said image forming system utilizes an ink jet recording means for forming an image by energizing electrical/thermal converters and by discharging ink from a discharge opening due to the growth of a bubble created by heating the ink to a temperature exceeding a film boiling point.

47. A laminating apparatus, comprising:
sheet feeding means for feeding a sheet on which an image is formed;

laminate film feeding means for feeding laminate films;

heating means for heating the laminate films fed, said heating means comprising a plurality of heating members, the total consumption of electric power of which is larger than an allowable amount of power;

pressure means for pressurizing the sheet and the laminate films that are fed by said sheet feeding means and laminate film feeding means, respectively, in an overlapping manner; and control means for selectively controlling the operation and non-operation of each heating member in such a manner that total consumption of electric power is lower than the allowable amount of electric power.

48. A laminating apparatus according to claim 47, wherein said heating means comprises a pre-heating member for pre-heating the laminate films and main heating members for performing the heating during the pressurization by said pressure means, and said control means operates said pre-heating member and said main heating members appropriately.

49. A laminating apparatus according to claim 48, wherein said control means turns one of said heating members ON when the other heating members are turned OFF, whereby the total consumption of electric power becomes lower than the allowable amount of electric power.

50. A laminating apparatus according to claim 48, wherein said pressure means comprises a pair of rollers, and said main heating members are disposed in said rollers, whereby the sheet and the laminate films are simultaneously heated and pressurized by said main heating members and said rollers.

51. An image forming system, comprising:
image forming means for forming an image on a sheet;
sheet feeding means for feeding a sheet on which an image is formed;
laminate film feeding means for feeding laminate films;
heating means for heating the laminate films being fed, said heating means comprising a plurality of heating members, the total consumption of electric power of which is larger than an allowable amount of power;
pressure means for pressurizing the sheet and the laminate films that are fed by said sheet feeding means and laminate film feeding means, respectively, in an overlapping manner; and
control means for selectively controlling the operation and non-operation of each heating member in such a manner that total consumption of electric power is lower than an allowable amount of electric power.

52. An image forming system according to claim 51, wherein said heating means comprises a pre-heating member for pre-heating the laminate films and main heating members for performing the heating during the pressurization by said pressure means, and said control means operates said pre-heating member and said main heating members appropriately.

53. An image forming system according to claim 52, wherein said control means turns one of said heating members ON when the other heating members are turned OFF, whereby the total consumption of electric power becomes lower than the allowable amount of electric power.

54. An image forming system according to claim 51, wherein said image forming system utilizes an ink jet recording means for forming an image by discharging ink.

55. An image forming system according to claim 54, wherein said image forming system utilizes an ink jet recording means for forming an image by energizing electrical/thermal converters and by discharging ink from a discharge opening due to the growth of a bubble created by heating the ink to a temperature exceeding a film boiling point.

* * * * *

UNITED STATES PATENT AND TRADEMARK OFFICE
CERTIFICATE OF CORRECTION

PATENT NO. : 5,306,381
DATED : April 26, 1994
INVENTOR(S) : Nakazawa, et al.

Page 1 of 2

It is certified that error appears in the above-indentified patent and that said Letters Patent is hereby corrected as shown below:

Title page
[30] FOREIGN APPLICATION PRIORITY DATA:

"June 11, 1991 [JP] Japan..... 3-766284" should read
--June 11, 1991 [JP] Japan..... 3-166284--.

[57] ABSTRACT:

Line 8, "temperature" should read --temperature detector--.

COLUMN 12:

Line 66, "feeding" should read --feeding back--.

COLUMN 13:

Line 60, "than turned" should read --than 130°C., the heater having the lower temperature is turned--.

COLUMN 15:

Line 2, "has been" should read --had--.

COLUMN 19:

Line 49, "to heat the rollers" (second occurrences) should be deleted.

COLUMN 22:

Line 61, "than" should read --than the--.

UNITED STATES PATENT AND TRADEMARK OFFICE
CERTIFICATE OF CORRECTION

PATENT NO. : 5,306,381
DATED : April 26, 1994
INVENTOR(S) : Nakazawa, et al.

It is certified that error appears in the above-indentified patent and that said Letters Patent is hereby corrected as shown below:

COLUMN 23:

Line 22, "absorbed by" should read --of-- and "of" should read --absorbed by--.
Line 35, "h eat" should read --heat--.

COLUMN 24:

Line 5, "heat" should read --heating--.
Line 8, "an" (first occurrence) should be deleted.
Line 15, "appara-" should read --means;.
Line 16, "tus;" should be deleted.

COLUMN 25:

Lines 41 and 42 should be deleted.

COLUMN 26:

Line 51, "films" should read --film--.
Line 58, "claim 41," should read --claim 45,--.

Signed and Sealed this

Fifteenth Day of November, 1994

Attest:

BRUCE LEHMAN

Attesting Officer   Commissioner of Patents and Trademarks